US010850795B2

(12) United States Patent
Oshiro et al.

(10) Patent No.: US 10,850,795 B2
(45) Date of Patent: Dec. 1, 2020

(54) THROTTLE GRIP DEVICE

(71) Applicant: ASAHI DENSO CO., LTD., Hamamatsu (JP)

(72) Inventors: Yukio Oshiro, Hamamatsu (JP); Yohei Mimura, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 16/773,265

(22) Filed: Jan. 27, 2020

(65) Prior Publication Data
US 2020/0239101 A1 Jul. 30, 2020

(30) Foreign Application Priority Data

Jan. 29, 2019 (JP) ................................ 2019-013513
Jan. 29, 2019 (JP) ................................ 2019-013514
Jul. 25, 2019 (JP) ................................ 2019-137075

(51) Int. Cl.
B62K 23/02 (2006.01)
F02D 11/02 (2006.01)
G05G 5/05 (2006.01)
(Continued)

(52) U.S. Cl.
CPC ............. B62K 23/04 (2013.01); F02D 11/02 (2013.01); G05G 5/05 (2013.01); G01D 5/145 (2013.01); G05G 2505/00 (2013.01)

(58) Field of Classification Search
CPC .......... B62K 23/02; B62K 23/04; G05G 1/08; G05G 5/05; G05G 2505/00; F02D 11/02; G01D 5/145
See application file for complete search history.

(56) References Cited

U.S. PATENT DOCUMENTS 6,377,016 B1 * 4/2002 Strong .................. B62K 23/02
318/139
6,729,203 B2 * 5/2004 Wesling ................ B62K 23/04
74/473.14
(Continued)

FOREIGN PATENT DOCUMENTS

EP 3330513 A1 * 6/2018 ............. F02D 11/02
JP 2015-081564 A 4/2015
(Continued)

OTHER PUBLICATIONS

Machine translation of JP 6059691 B2 obtained on Apr. 1, 2020.*
European Search Report issued in Patent Application No. EP 20154376.6 dated Jul. 1, 2020.

Primary Examiner — Adam D Rogers
(74) Attorney, Agent, or Firm — Pearne & Gordon LLP

(57) ABSTRACT

A throttle grip device includes: an interlocking member capable of rotating with an rotational operation of a throttle grip; a rotation angle detecting unit capable of detecting a rotation angle of the throttle grip by detecting a rotation angle of the interlocking member; and a return spring configured by a torsion coil spring which has one end locked to the interlocking member and urges the throttle grip and the interlocking member in a rotation direction toward initial positions when the throttle grip is rotationally operated. An engine can be controlled according to the rotation angle of the throttle grip detected by the rotation angle detecting unit, and the throttle grip device comprises a holding member which rotatably holds the interlocking member while positioning the interlocking member and holds the other end of the return spring while locking the other end of the return spring.

20 Claims, 27 Drawing Sheets

(51) Int. Cl.
*G01D 5/14* (2006.01)
*B62K 23/04* (2006.01)

(56) References Cited

U.S. PATENT DOCUMENTS

| | | | | |
|---|---|---|---|---|
| 6,879,150 B2 * | 4/2005 | Sekiya | ............... | G01D 5/145 |
| | | | | 324/207.2 |
| 8,278,912 B2 * | 10/2012 | Cavallo | ............... | B62K 23/04 |
| | | | | 324/207.2 |
| 8,353,111 B2 * | 1/2013 | Baldassari | ......... | B62K 23/04 |
| | | | | 33/1 PT |
| 8,896,299 B2 * | 11/2014 | Iwahashi | ............. | G01D 5/145 |
| | | | | 324/207.25 |
| 8,922,201 B2 * | 12/2014 | Iwahashi | ............. | B62K 23/04 |
| | | | | 324/207.2 |
| 9,086,719 B2 * | 7/2015 | Nomura | ............... | B62K 23/04 |
| 9,168,971 B2 * | 10/2015 | Sato | ................. | B62K 23/04 |
| 9,448,054 B2 * | 9/2016 | Nomura | ............... | G01B 7/30 |
| 10,377,441 B2 * | 8/2019 | Oshiro | ................ | B62K 23/04 |
| 2010/0132500 A1 * | 6/2010 | Cominetti | ........... | B62K 23/04 |
| | | | | 74/504 |
| 2011/0036196 A1 * | 2/2011 | Menghini | ............ | B62K 23/04 |
| | | | | 74/488 |
| 2018/0154975 A1 | 6/2018 | Oshiro | | |

FOREIGN PATENT DOCUMENTS

| | | | | |
|---|---|---|---|---|
| JP | 6059691 B2 * | 1/2017 | | |
| JP | 2018-091201 A | 6/2018 | | |
| JP | 2018-091202 A | 6/2018 | | |
| WO | WO-2013146159 A1 * | 10/2013 | ............ | B62K 23/04 |

* cited by examiner

THROTTLE GRIP DEVICE

CROSS-REFERENCE TO RELATED APPLICATIONS

This application is based upon and claims the benefit of priority from prior Japanese patent application No. 2019-013513, filed on Jan. 29, 2019, Japanese patent application No. 2019-013514, filed on Jan. 29, 2019, and Japanese patent application No. 2019-137075, filed on Jul. 25, 2019 the entire contents of which are incorporated herein by reference.

TECHNICAL FIELD

The present invention relates to a throttle grip device in which an engine of a vehicle is controlled based on a rotational operation of a throttle grip.

BACKGROUND ART

In recent two-wheeled vehicles, a throttle grip device configured such that a rotation angle of a throttle grip is detected by a throttle opening sensor such as a potentiometer and the detected value is sent as an electric signal to an electronic control device or the like mounted to the two-wheeled vehicle has come into wide use. Further, the electronic control device performs a predetermined calculation based on the detection signal, and the ignition timing of an engine and the opening and closing of an intake valve or a throttle vale are controlled based on the calculation result.

A conventional throttle grip device is disclosed in Patent Literature 1, for example. In such a conventional throttle grip device, a magnet is attached to an interlocking member working with a throttle grip, and a magnetic change of the magnet is detected by a magnetic sensor. In this way, the rotation angles of the interlocking member and the throttle grip are detected, and an engine control is performed.

Further, the conventional throttle grip device includes a return spring that is configured by a torsion coil spring for urging the throttle grip and the interlocking member in a rotation direction toward their initial positions. The throttle grip device is configured such that an urging force of the return spring is applied to the interlocking member when the throttle grip is rotationally operated. In this way, when a gripping force of a driver is loosened after the throttle grip is rotationally operated, the throttle grip returns to its initial position by the urging force of the return spring.

Patent Literature 1: JP-A-2015-81564

However, in the above conventional art, it is necessary to assemble the interlocking member and the return spring to a case, respectively. Therefore, a demand for improving the workability in assembly is increasing. Further, there is a problem that the width dimension required for assembling the return spring and the interlocking member becomes large when the return spring is disposed at a position adjacent to the interlocking member.

Moreover, in the above conventional art, the positioning of the interlocking member, particularly the positioning in the radial direction, may be difficult due to the structure of a case or the layout of components. In that case, the rotation of the interlocking member swings in the radial direction and becomes unstable. Accordingly, there is a possibility that the detection accuracy of the rotation angle of the throttle grip by the rotation angle detecting means may be lowered. Further, due to the layout of components, it may be difficult to lock, at an appropriate position, the other end of the return spring having one end locked to the interlocking member. Accordingly, there is a possibility that the urging of the interlocking member in the rotation direction cannot be desirably performed.

The present invention has been made in view of the above situations, and an object thereof is to provide a throttle grip device capable of improving the workability in assembly by integrating an interlocking member and a return spring and reducing the width dimension required for assembling the interlocking member and the return spring.

Another object of the present invention is to provide a throttle grip device capable of stably rotating an interlocking member and locking a return spring at an appropriate position.

SUMMARY OF INVENTION

According to an aspect of the invention, there is provided a throttle grip device comprising: an interlocking member capable of rotating with a rotational operation of a throttle grip of a vehicle; a rotation angle detecting unit capable of detecting a rotation angle of the throttle grip by detecting a rotation angle of the interlocking member; and a return spring configured by a torsion coil spring which has one end locked to the interlocking member and urges the throttle grip and the interlocking member in a rotation direction toward initial positions when the throttle grip is rotationally operated, wherein an engine of the vehicle can be controlled according to the rotation angle of the throttle grip detected by the rotation angle detecting unit, and wherein the throttle grip device comprises a holding member which rotatably holds the interlocking member while positioning the interlocking member and holds the other end of the return spring while locking the other end of the return spring.

The holding member may have a guide portion formed to protrude in an annular shape, and the interlocking member may be positioned by being rotatably fitted to the guide portion.

The holding member may have the guide portion, a locking portion for locking the other end of the return spring, and a holding portion held in contact with the interlocking member urged in the rotation direction by the return spring.

The holding member may be formed of a plate-like member.

The return spring may urge the interlocking member in an axial direction in addition to the rotation direction.

The interlocking member may be separate from the throttle grip.

The interlocking member may be integrated with the throttle grip.

According to another aspect of the invention, there is provided a throttle grip device comprising: an interlocking member capable of rotating with an rotational operation of a throttle grip of a vehicle; a rotation angle detecting unit capable of detecting a rotation angle of the throttle grip by detecting a rotation angle of the interlocking member; and a return spring configured by a torsion coil spring which has one end locked to the interlocking member and urges the throttle grip and the interlocking member in a rotation direction toward initial positions when the throttle grip is rotationally operated, wherein an engine of the vehicle can be controlled according to the rotation angle of the throttle grip detected by the rotation angle detecting unit, and wherein the interlocking member has an accommodation recess for accommodating the return spring, and the throttle grip device comprises a holding member which is attached to the interlocking member while locking the other end of the return spring accommodated in the accommodation recess and integrates the interlocking member and the return spring.

The holding member may have a locking portion for locking the other end of the return spring, and a holding portion held in contact with the interlocking member urged in the rotation direction by the return spring.

The holding member may be attached to the interlocking member while closing the accommodation recess.

The holding member may be formed of a plate-like member.

The return spring may urge the interlocking member in an axial direction in addition to the rotation direction.

The throttle grip can be rotationally operated in a forward direction and a reverse direction, the throttle grip and the interlocking member may be urged by the return spring when the throttle grip is rotationally operated in the forward direction from an initial position, and the throttle grip device may comprise a reverse-rotation return spring for urging the throttle grip and interlocking member in the rotation direction toward the initial positions when the throttle grip is rotationally operated in the reverse direction from the initial position.

The return spring may be attached to an inner diameter side of the interlocking member, and the reverse-rotation return spring may be attached to a portion of the interlocking member on an outer diameter side from an attachment position of the return spring.

A slide member for holding the reverse-rotation return spring may be attached to the interlocking member, and when the throttle grip is rotationally operated in the reverse direction, the slide member may move relative to the interlocking member to compress the reverse-rotation return spring, and an urging force generated by the compression of the reverse-rotation return spring may be applied to the throttle grip.

The slide member may be formed of an arc-shaped part extending in a circumferential direction of the interlocking member, and the slide member can move in the circumferential direction of the interlocking member and compress the reverse-rotation return spring when the throttle grip is rotationally operated in the reverse direction.

The rotation angle detecting unit may be configured by a sensor that is capable of detecting the rotation angle of the interlocking member by detecting a change in magnetism generated from a magnet attached to a predetermined position of the interlocking member, and the magnet and the slide member may be arranged side by side in a circumferential direction of the interlocking member.

The rotational operation in the forward direction and the reverse direction of the throttle grip can be detected by the rotation angle detecting unit.

The rotational operation in the forward direction of the throttle grip may be detected by the rotation angle detecting unit, and the throttle grip device may comprise a micro switch capable of detecting the rotational operation in the reverse direction of the throttle grip.

The micro switch may include an operating portion that can be operated while projecting and retracting, the interlocking member may have a protruding portion having an inclined surface formed on one surface, the micro switch may be mounted such that an operation direction of the operating portion is perpendicular to one surface of the protruding portion of the interlocking member, and the operating portion may be pressed by the inclined surface and turned on when the interlocking member is rotated in the reverse direction.

The interlocking member may be separate from the throttle grip.

The interlocking member may be integrated with the throttle grip.

According to an aspect of the invention, the throttle grip device includes the holding member that rotatably holds the interlocking member while positioning the same and holds the other end of the return spring while locking the same. Therefore, it is possible to stably rotate the interlocking member and lock the return spring at an appropriate position.

According to an aspect of the invention, the holding member has the guide portion formed to protrude in an annular shape, and the interlocking member is positioned by being rotatably fitted to the guide portion. Therefore, the positioning of the interlocking member, particularly the positioning in the radial direction, can be reliably performed with a simple configuration.

According to an aspect of the invention, the holding member has the guide portion, the locking portion for locking the other end of the return spring, and the holding portion held in contact with the interlocking member urged in the rotation direction by the return spring. Therefore, the positioning in the radial direction of the interlocking member by the guide portion, the locking of the return spring by the locking portion, and the holding of the holding member to the interlocking member by the holding portion can be performed together.

According to an aspect of the invention, the holding member is formed of a plate-like member. Therefore, the thickness of the throttle grip device can be reduced.

According to an aspect of the invention, the return spring urges the interlocking member in the axial direction in addition to the rotation direction. Therefore, the return spring can press the interlocking member while having elasticity in the axial direction to absorb backlash, so that the interlocking member can be stably rotated and the operability of the throttle grip can be maintained.

According to an aspect of the invention, the interlocking member is separate from the throttle grip. Therefore, an excessive load applied to the throttle grip can be prevented from being transmitted to the interlocking member, and the replacement of the interlocking member or the throttle grip can be facilitated.

According to an aspect of the invention, the interlocking member is integrated with the throttle grip. Therefore, as compared with the case where the interlocking member is separate from the throttle grip, the number of parts can be reduced, and the workability in assembly of the throttle grip device can be improved. [0023] According to an aspect of the invention, the interlocking member has the accommodation recess for accommodating the return spring. The throttle grip device includes the holding member which is attached to the interlocking member while locking the other end of the return spring accommodated in the accommodation recess and integrates the interlocking member and the return spring. Therefore, the interlocking member and the return spring can be integrated to improve the workability in assembly, and the width dimension required for assembling the interlocking member and the return spring can be reduced.

According to an aspect of the invention, the holding member has the locking portion for locking the other end of the return spring, and the holding portion held in contact with the interlocking member urged in the rotation direction by the return spring. Therefore, the urging force by the return spring can be reliably applied to the interlocking member, and the integrated structure of the interlocking member and the return spring can be reliably held.

According to an aspect of the invention, the holding member is attached to the interlocking member while closing the accommodation recess. Therefore, foreign matters and the like can be prevented from entering the accommodation recess, and the urging force by the return spring can be applied to the interlocking member.

According to an aspect of the invention, the holding member is formed of a plate-like member. Therefore, the thickness of the throttle grip device can be reduced.

According to an aspect of the invention, the return spring urges the interlocking member in the axial direction in addition to the rotation direction. Therefore, the return spring can press the interlocking member while having elasticity in the axial direction to absorb backlash, so that the interlocking member can be stably rotated and the operability of the throttle grip can be maintained.

According to an aspect of the invention, the throttle grip can be rotationally operated in the forward direction and the reverse direction, and the throttle grip and the interlocking member are urged in the rotation direction toward the initial position by the return spring when the throttle grip is rotationally operated in the forward direction from the initial position. Further, the throttle grip device includes the reverse-rotation return spring that urges the throttle grip and the interlocking member in the rotation direction toward the initial position when the throttle grip is rotationally operated in the reverse direction from the initial position. Therefore, it is possible to make the operation feeling different between the rotational operation in the forward direction of the throttle grip and the rotational operation in the reverse direction of the throttle grip. In this way, an appropriate urging force can be applied during each operation.

According to an aspect of the invention, the return spring is attached to the inner diameter side of the interlocking member, and the reverse-rotation return spring is attached to the portion of the interlocking member on the outer diameter side from the attachment position of the return spring. Therefore, the return spring and the reverse-rotation return spring can be arranged in the radial direction of the interlocking member, so that an increase in the width dimension can be suppressed.

According to an aspect of the invention, the slide member holding the reverse-rotation return spring is attached to the interlocking member, the slide member moves relative to the interlocking member and compresses the reverse-rotation return spring when the throttle grip is rotationally operated in the reverse direction, and the urging force generated by the compression of the reverse-rotation return spring is applied to the throttle grip. Therefore, the rotational force in the reverse direction of the throttle grip can be smoothly and reliably transmitted to the slide member, and the urging force of the reverse-rotation return spring can be efficiently applied to the throttle grip.

According to an aspect of the invention, the slide member is formed of an arc-shaped part extending in the circumferential direction of the interlocking member, and the slide member can move in the circumferential direction of the interlocking member and compress the reverse-rotation return spring when the throttle grip is rotationally operated in the reverse direction. Therefore, the slide member and its moving range can be easily formed with respect to the interlocking member.

According to an aspect of the invention, the rotation angle detecting unit is configured by a sensor that is capable of detecting the rotation angle of the interlocking member by detecting a change in magnetism generated from the magnet attached to a predetermined position of the interlocking member, and the magnet and the slide member are arranged side by side in the circumferential direction of the interlocking member. Therefore, an increase in the radial dimension of the interlocking member can be suppressed, and the size of the throttle grip device can be reduced.

According to an aspect of the invention, the rotational operation in the forward direction and the reverse direction of the throttle grip can be detected by the rotation angle detecting unit. Therefore, a separate switch for detecting the rotational operation in the reverse direction of the throttle grip can be dispensed with, and the number of parts can be reduced.

According to an aspect of the invention, the rotational operation in the forward direction of the throttle grip can be detected by the rotation angle detecting unit, and the throttle grip device includes the micro switch capable of detecting the rotational operation in the reverse direction of the throttle grip. Therefore, the rotational operation in the reverse direction of the throttle grip can be reliably detected by the micro switch, and operability when starting the engine can be further improved.

According to an aspect of the invention, the micro switch is mounted such that the operation direction of the operating portion is perpendicular to one surface of the protruding portion of the interlocking member, and the operating portion is pressed by the inclined surface and turned on when the interlocking member is rotated in the reverse direction. Therefore, the operating portion of the micro switch can be pressed within an appropriate stroke range when the interlocking member is rotated in the reverse direction.

According to an aspect of the invention, the interlocking member is separate from the throttle grip. Therefore, an excessive load applied to the throttle grip can be prevented from being transmitted to the interlocking member, and the replacement of the interlocking member or the throttle grip can be facilitated.

According to an aspect of the invention, the interlocking member is integrated with the throttle grip. Therefore, as compared with the case where the interlocking member is separate from the throttle grip, the number of parts can be reduced, and the workability in assembly of the throttle grip device can be improved.

DESCRIPTION OF EMBODIMENTS

Hereinafter, embodiments of the present invention will be specifically described with reference to the drawings.

Figure 1:
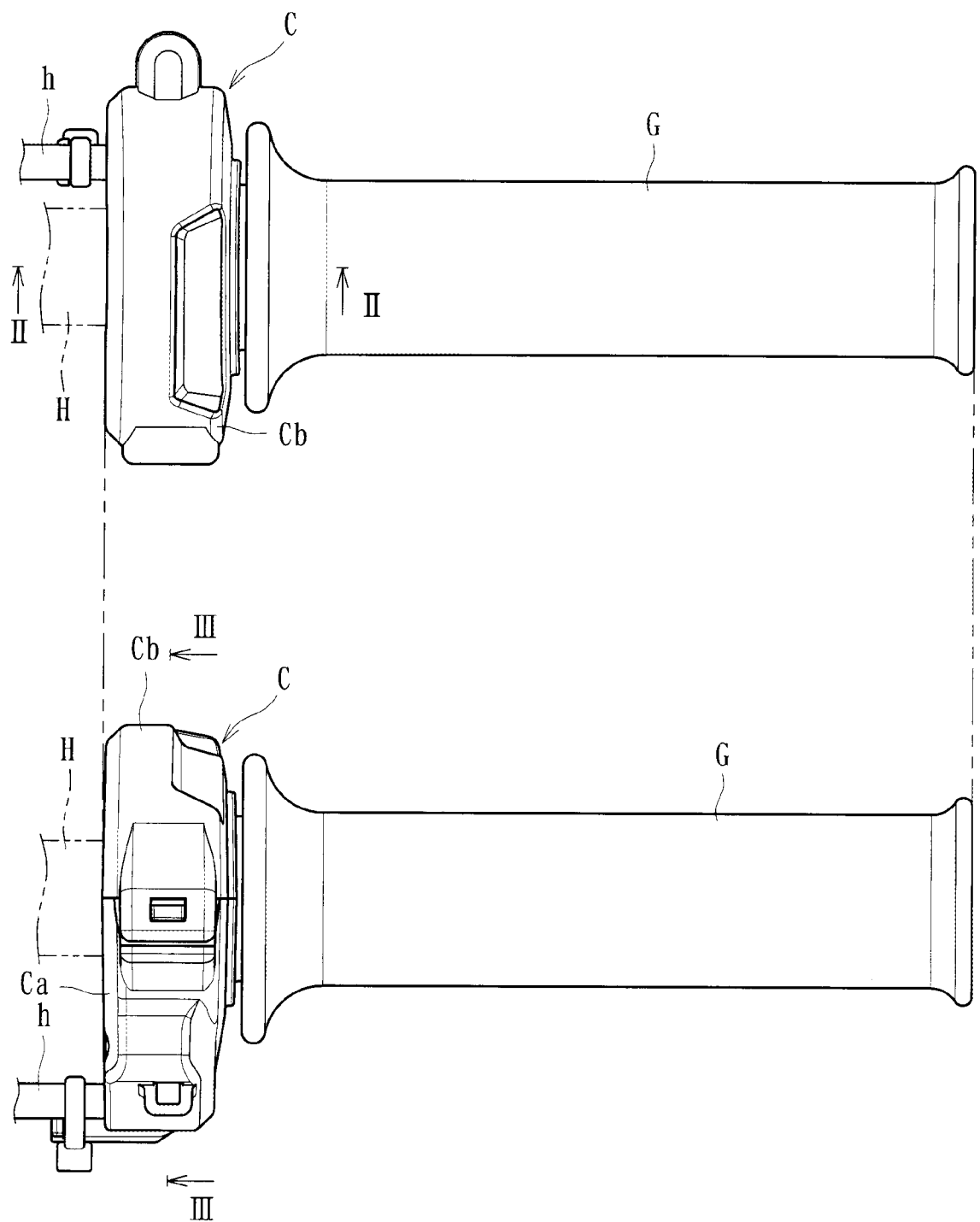
FIG. 1 is a front view and a side view showing an appearance of a throttle grip device according to a first embodiment of the present invention.

As shown in FIG. 1, a throttle grip device according to a first embodiment is configured to detect a rotation angle of a throttle grip G attached to a handle pipe of a two-wheeled vehicle and transmit a detected signal to an electronic control device such as an ECU mounted to the two-wheeled vehicle. As shown in FIGS. 1 to 10, the throttle grip device includes an interlocking member 1, a magnetic sensor 2 (rotation angle detecting unit), a return spring 3, a holding member 4, and a case C.

Figure 5:
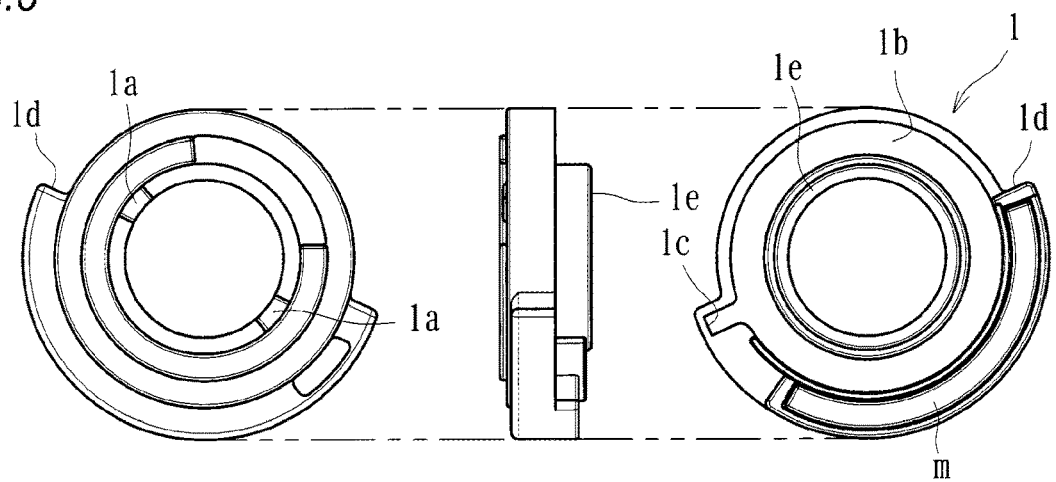
FIG. 5 is a three-side view showing an interlocking member of the throttle grip device.
Figure 6:
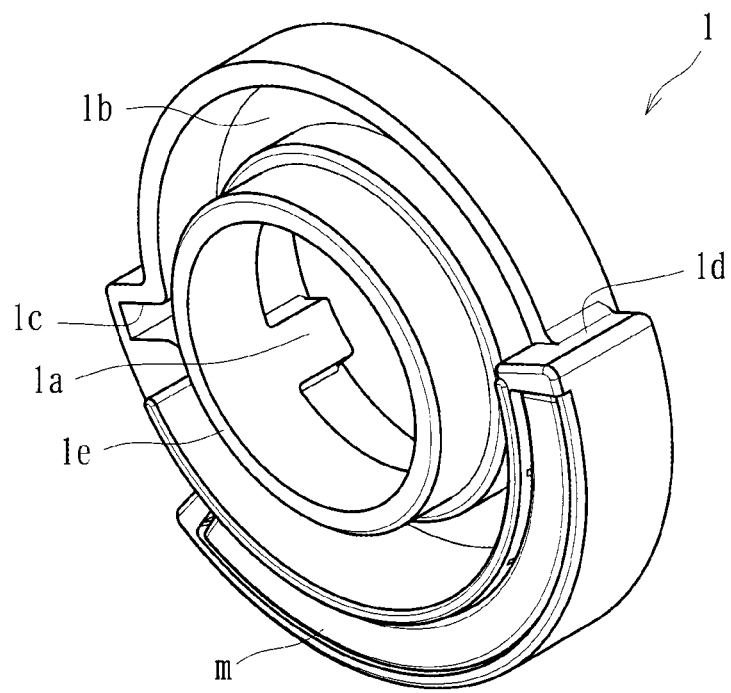
FIG. 6 is a perspective view showing the interlocking member.

The interlocking member 1 can rotate with the rotational operation of the throttle grip G of the vehicle. As shown in FIGS. 5 and 6, the interlocking member 1 is made of a substantially cylindrical resin molded product. The interlocking member 1 has a fitted portion 1a into which a fitting portion Ga (see FIG. 2) of the throttle grip G can be fitted, an accommodation recess 1b for accommodating the return spring 3, a locking portion 1c for locking one end 3a of the return spring 3, and a stopper portion 1d protruding at a predetermined position.

Further, the interlocking member 1 according to the present embodiment has one end surface to which an arc-shaped magnet m is attached. The magnet m is configured such that the magnetic field continuously changes in a circumferential direction. The magnet m can rotate with the rotation of the interlocking member 1. The magnet m may have a helical surface whose height continuously changes while bending in an arc shape. In that case, it is necessary to place the magnetic sensor 2 (rotation angle detecting unit) so as to face the helical surface in a state of being attached to the interlocking member 1.

Figure 7:
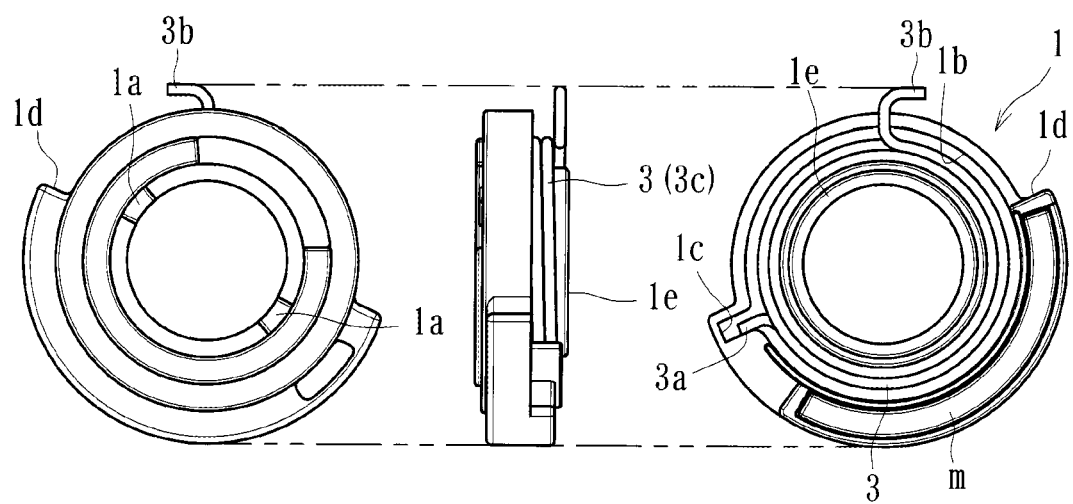
FIG. 7 is a three-side view showing a state in which a return spring is assembled to the interlocking member.
Figure 8:
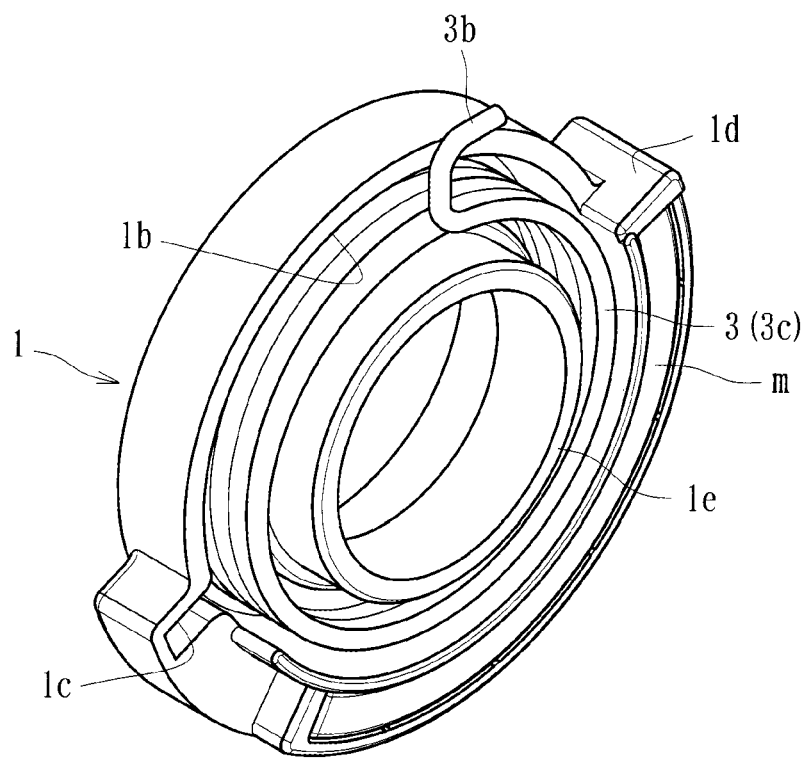
FIG. 8 is a perspective view showing a state in which the return spring is assembled to the interlocking member.

Furthermore, the accommodation recess 1b has a groove shape formed in an annular shape on the one end surface of the interlocking member 1. The locking portion 1c is formed in a part of the accommodation recess 1b. In addition, when the return spring 3 is accommodated in the accommodation recess 1b, the return spring 3 is locked in such a manner that a coil portion 3c is fitted into the accommodation recess 1b and the one end 3a is fitted into the locking portion 1c, as shown in FIGS. 7 and 8. In this way, the return spring 3 is provided in the interlocking member 1, so that the width dimension can be reduced.

Figure 3:
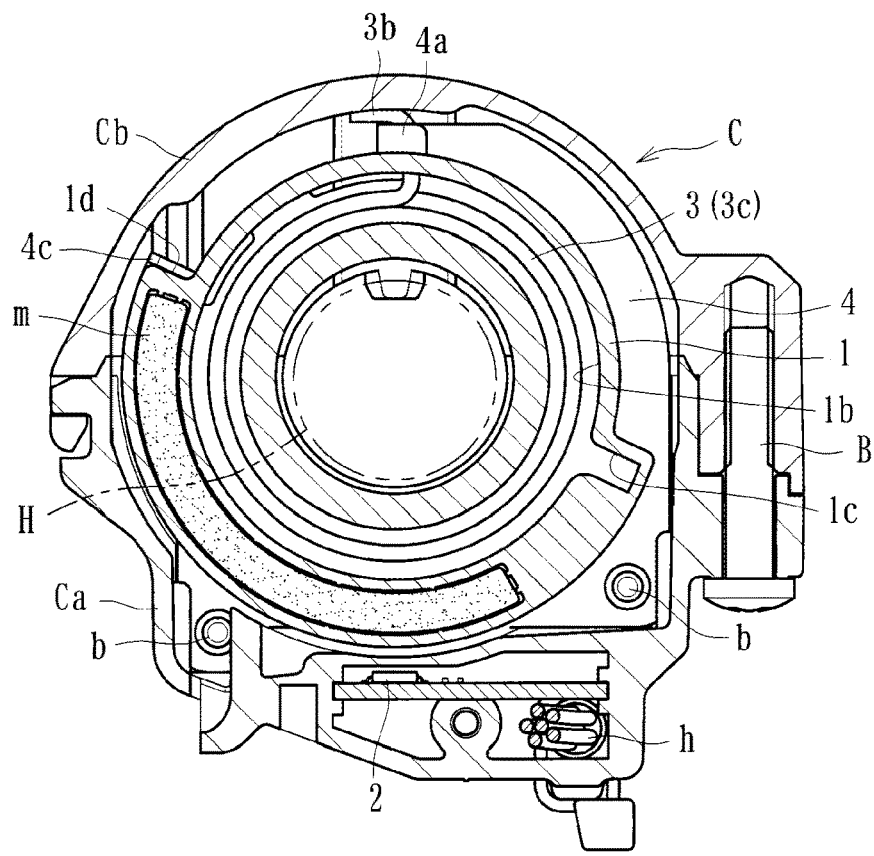
FIG. 3 is a sectional view taken along the line in FIG. 1.
Figure 4:
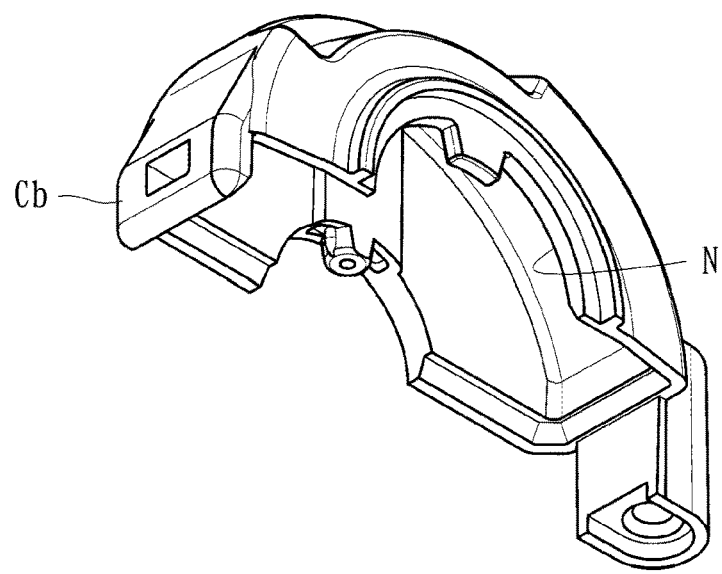
FIG. 4 is a perspective view showing a case of the throttle grip device.
Figure 4:
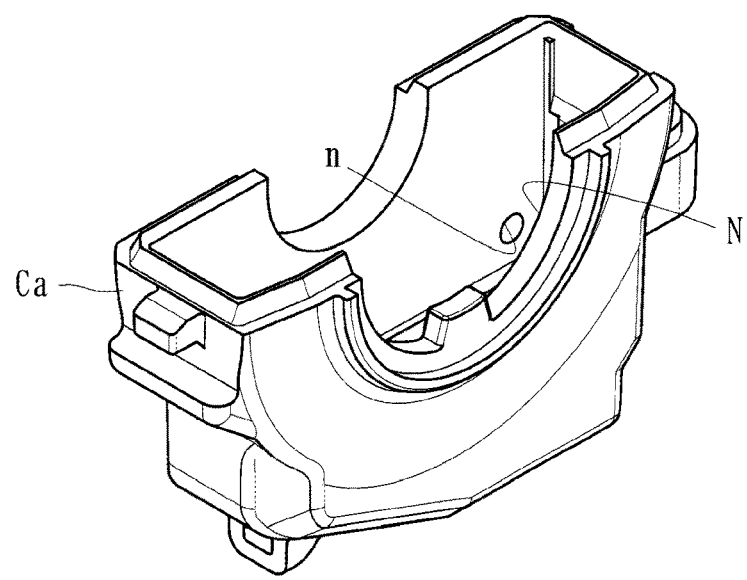

The case C is fixed to a leading end side (a base end side of the throttle grip G) of a handle pipe H (see FIG. 3) of the two-wheeled vehicle (vehicle). As shown in FIGS. 3 and 4, the case C is configured by assembling a lower case Ca and an upper case Cb with a bolt B (see FIG. 3). As shown in FIG. 4, each of the lower case Ca and the upper case Cb has an accommodation recess formed therein. When the lower case Ca and the upper case Cb are assembled, an accommodation space is formed inside.

Figure 2:
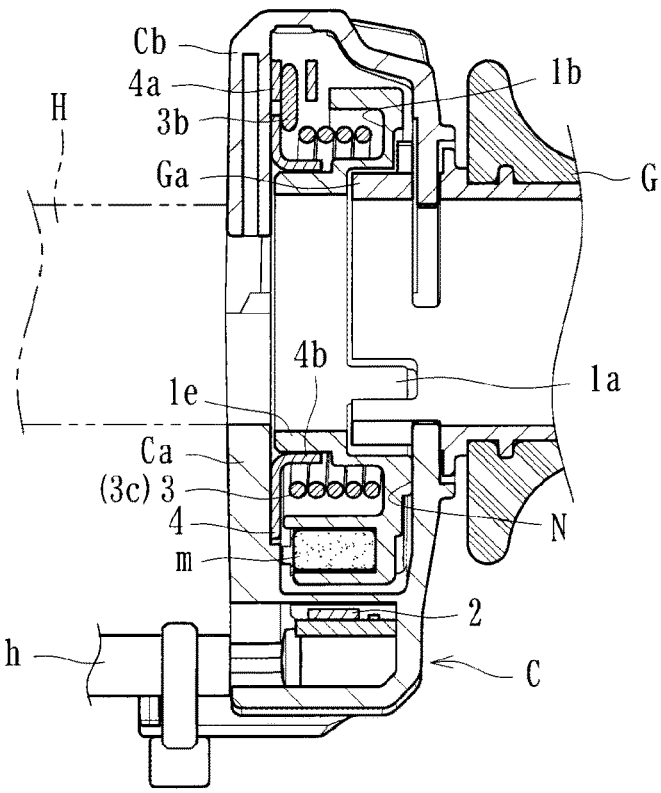
FIG. 2 is a sectional view taken along the line II-II in FIG. 1.

Further, as shown in FIGS. 2 and 3, the lower case Ca has a sliding surface N on which the one end surface of the interlocking member 1 can contact and slide. The lower case Ca is configured such that the magnetic sensor 2 is mounted at a position where a magnetic change of the magnet m can be detected. Meanwhile, as shown in FIG. 4, a screw hole n is formed in a wall surface of the lower case Ca, and the holding member 4 can be screwed to a predetermined position in the lower case Ca.

As shown in FIGS. 2 and 3, the magnetic sensor 2 (rotation angle detecting unit) is configured by a sensor disposed at a predetermined position of the lower case Ca. The magnetic sensor 2 can detect a change in magnetism generated from the magnet m, thereby detecting a rotation angle of the interlocking member 1 and detecting a rotation angle of the throttle grip G. Specifically, the magnetic sensor 2 can obtain an output voltage according to a change in the magnetic field of the magnet m (change in magnetic flux density). For example, the magnetic sensor 2 is configured by a Hall element (specifically, a linear Hall IC capable of obtaining an output voltage proportional to the magnetic field (magnetic flux density) of the magnet m) that is a magnetic sensor using the Hall effect. Thus, when the magnet m rotates as the interlocking member 1 rotates due to the rotational operation of the throttle grip G, the magnetism changes.

In this way, since the magnetism changes depending on the rotation angle of the interlocking member 1, an output voltage corresponding to the rotation angle can be obtained, and the rotation angle of the interlocking member 1 (i.e., the rotation angle of the throttle grip G) can be detected based on the output voltage. The rotation angle of the throttle grip G detected in this manner is transmitted as an electric signal to an ECU (Engine Control Unit) mounted to the two-wheeled vehicle, and an engine of the vehicle can be controlled according to the transmitted rotation angle of the throttle grip G. Meanwhile, the reference numeral "h" in the drawings represents a wiring extending from the magnetic sensor 2, and the detection signal is transmitted to the vehicle side via the wiring h.

Figure 9:
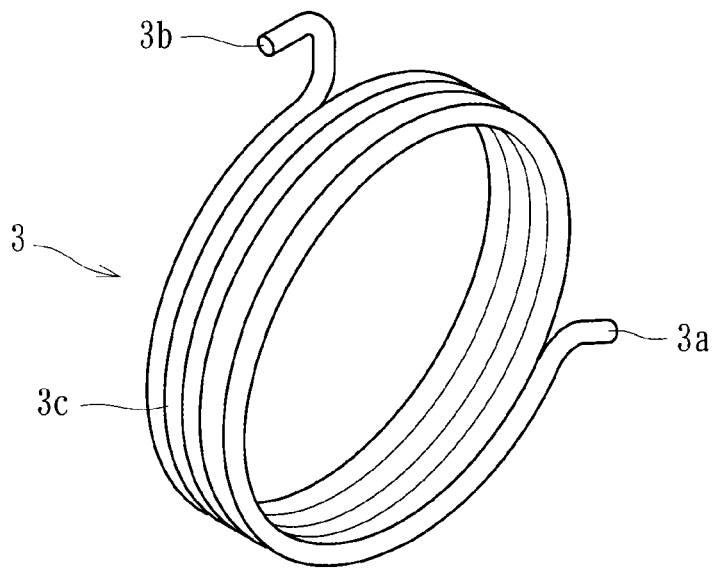
FIG. 9 is a perspective view showing the return spring of the throttle grip device.

The return spring 3 is configured by a torsion coil spring that urges the throttle grip G and the interlocking member 1 in a rotation direction α toward their initial positions when the throttle grip G is rotationally operated. As shown in FIG. 9, the return spring 3 includes the one end 3a locked to the locking portion 1c of the interlocking member 1, the other end 3b locked to a locking portion 4a of the holding member 4, and the coil portion 3c located between the one end 3a and the other end 3b.

Thus, the return spring 3 is assembled in such a manner that the one end 3a is attached to the interlocking member 1 and the other end 3b is attached to the holding member 4. When the throttle grip G is rotated, the interlocking member 1 rotates against an urging force of the return spring 3. Therefore, the urging force is transmitted to the throttle grip G, and a force acts to return the throttle grip G and the interlocking member 1 to their initial positions.

Figure 10:
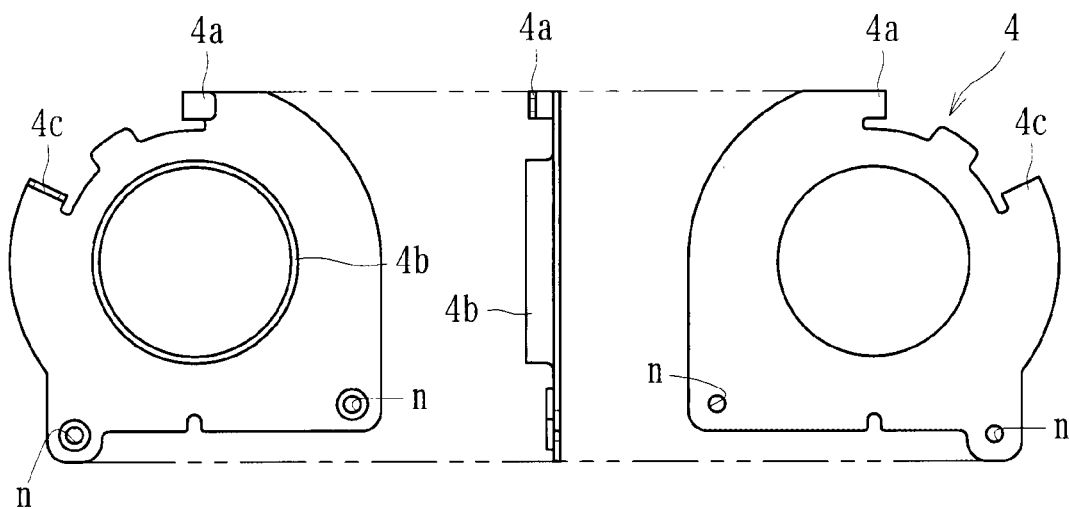
FIG. 10 is a three-side view showing a holding member of the throttle grip device.

The holding member 4 rotatably holds the interlocking member 1 while positioning the same, and holds the other end 3b of the return spring 3 while locking the same. As shown in FIG. 10, the holding member 4 is formed of a metallic plate-like member that includes the locking portion 4a for locking the other end 3b of the return spring 3, a guide portion 4b for positioning and holding the interlocking member 1, and a holding portion 4c formed at a predetermined position. Meanwhile, the screw hole n is formed at a predetermined position of the holding member 4, and the holding member 4 can be screwed to a predetermined position in the lower case Ca.

The locking portion 4a is formed of a portion obtained by bending a part of the holding member 4, and is configured to reliably lock the other end 3b of the return spring 3. The guide portion 4b is formed of a portion obtained by protruding a part of the holding member 4 in an annular shape by burring or the like. As shown in FIG. 2, the guide portion 4b can be rotatably fitted with the interlocking member 1 by inserting an annular wall portion 1e (see FIG. 8) integrally formed with the interlocking member 1 through the guide portion 4b, thereby positioning (especially, positioning in the radial direction) the interlocking member 1.

The holding portion 4c is held in contact with the stopper portion 1d of the interlocking member 1 urged in the rotation direction by the return spring 3. That is, as shown in FIGS. 7 and 8, the other end 3b of the return spring 3 is locked to the locking portion 4a of the holding member 4 in a state where the return spring 3 is accommodated in the accommodation recess 1b. Then, the coil portion 3c of the return spring 3 is twisted to relatively rotate the holding member 4 and the interlocking member 1 by a fixed angle in a direction in which a predetermined urging force is generated. In this way, the holding portion 4c of the holding member 4 comes into contact with the stopper portion 1d of the interlocking member 1. In this contact state, the holding portion 4c of the holding member 4 receives the urging force in the rotation direction α of the return spring 3. As a result, the holding member 4 can hold the interlocking member 1 urged in the rotation direction α by the return spring 3.

Figure 11:
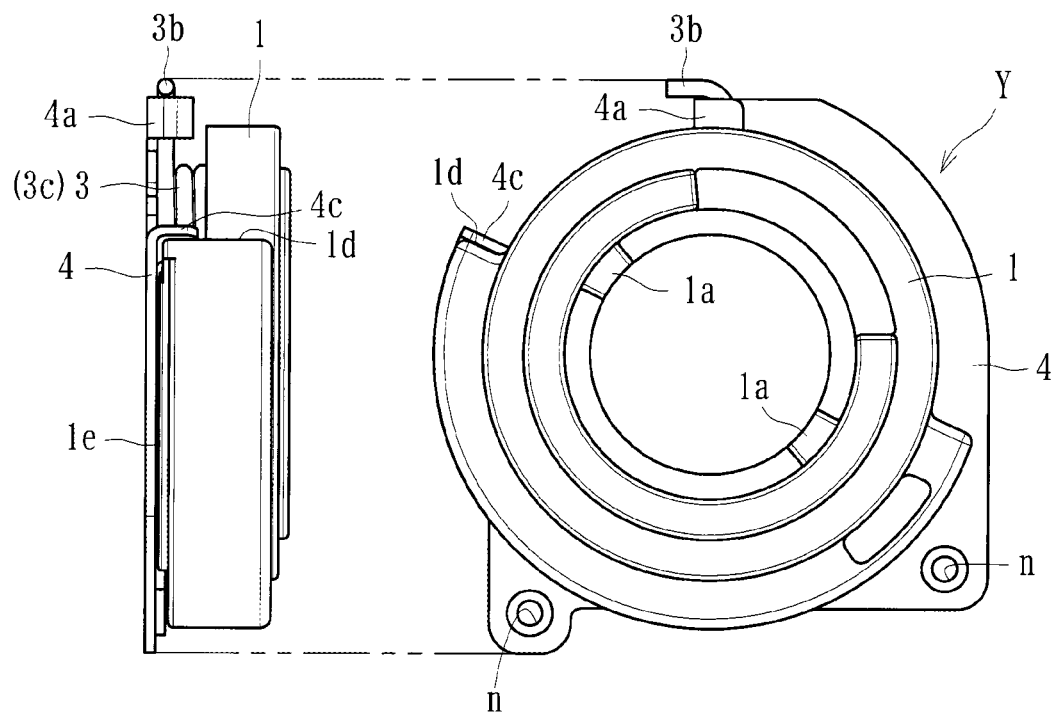
FIG. 11 is a plan view and a side view showing the interlocking member and the return spring integrated by the holding member.
Figure 12:
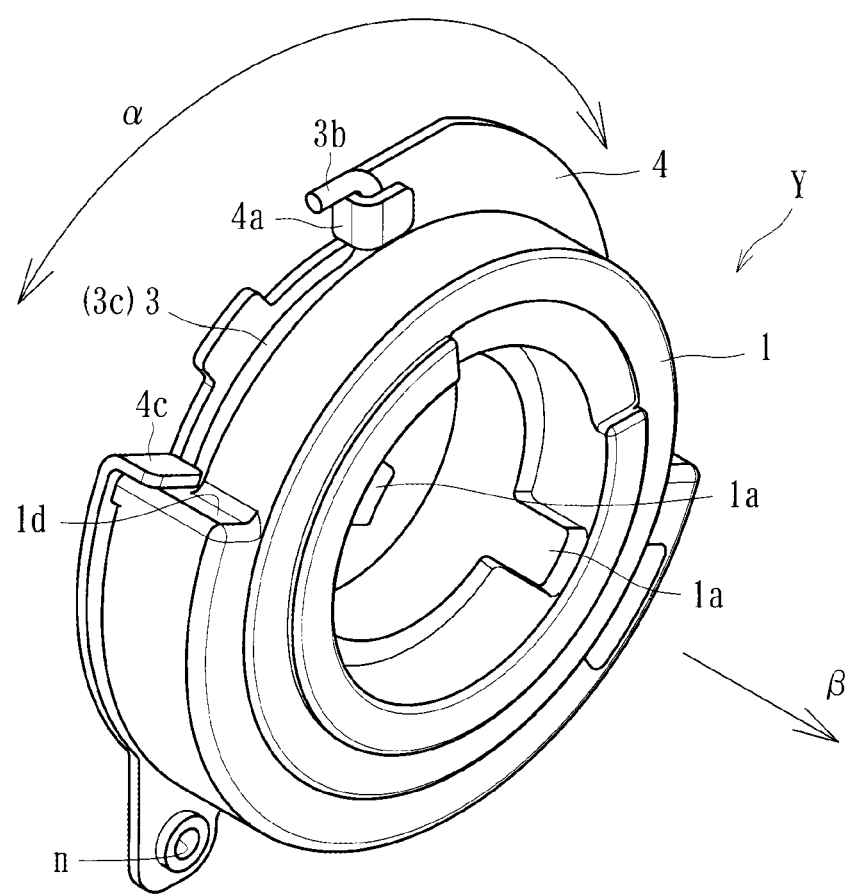
FIG. 12 is a perspective view showing the interlocking member and the return spring integrated by the holding member.
Figure 13:
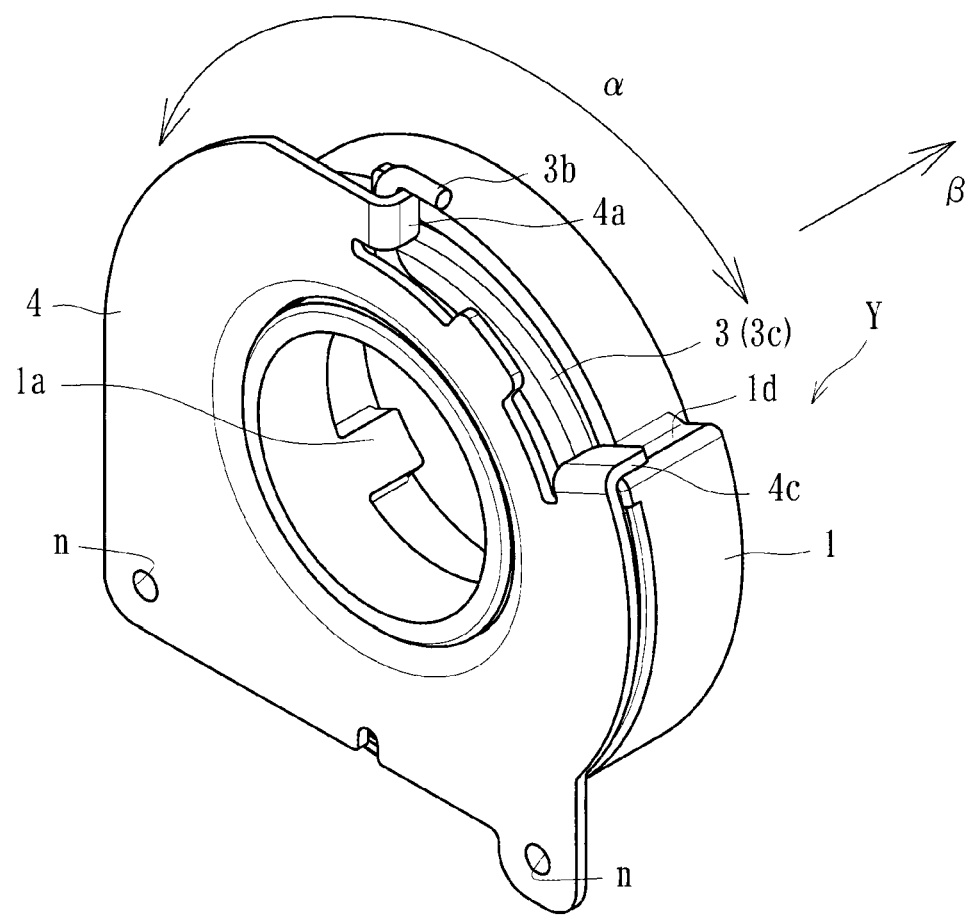
FIG. 13 is a perspective view showing the interlocking member and the return spring integrated by the holding member.

In this way, the holding member 4 locks the other end 3b of the return spring 3 accommodated in the accommodation recess 1b and holds the interlocking member 1 with a predetermined urging force in the rotation direction α. Therefore, as shown in FIGS. 11 to 13, the interlocking member 1 and the return spring 3 are integrated. Thus, the interlocking member 1 and the return spring 3 integrated by the holding member 4 are referred to as a unit Y, and the unit Y is attached and fixed at a predetermined position in the case C, as shown in FIG. 2.

Furthermore, the return spring 3 according to the present embodiment urges the interlocking member 1 in an axial direction β in addition to the rotation direction α. Specifically, as shown in FIG. 9, the return spring 3 according to the present embodiment is configured such that the coil portion 3c has a gap between adjacent windings. As shown in FIG. 2, when the return spring 3 is accommodated in the case C in a state (a state of the unit Y shown in FIGS. 11 to 13) of being integrated by the holding member 4, the return spring 3 is compressed in a direction in which the gap between the windings of the coil portion 3c becomes smaller, and urges the interlocking member 1 in the axial direction β. In this way, the interlocking member 1 is assembled with one end surface pressed against the sliding surface N of the case C by the urging force of the return spring 3 in the axial direction β.

However, when the throttle grip G is rotationally operated, the interlocking member 1 rotates against the urging force in the rotation direction α of the return spring 3, and the one end surface of the interlocking member 1 slides while being pressed against the sliding surface N of the case C. On the other hand, when trying to rotationally operate the throttle grip G from the initial position toward the opposite side, the rotational operation of the throttle grip G from the initial position toward the opposite side can be prevented because the stopper portion 1*d* of the interlocking member 1 is in contact with the holding portion 4*c* of the holding member 4.

According to the present embodiment, the throttle grip device includes the holding member 4 for rotatably holding the interlocking member 1 while positioning the same, and holding the other end 3*b* of the return spring 3 while locking the same. Therefore, the interlocking member 1 can be stably rotated, and the return spring 3 can be locked at an appropriate position. Further, since the holding member 4 according to the present embodiment has the guide portion 4*b* formed to protrude in an annular shape, and the interlocking member 1 is positioned by being rotatably fitted to the guide portion 4*b*, the positioning of the interlocking member 1, particularly the positioning in the radial direction, can be reliably performed with a simple configuration.

Furthermore, since the holding member 4 according to the present embodiment has the guide portion 4*b*, the locking portion 4*a* for locking the other end 3*b* of the return spring 3, and the holding portion 4*c* held in contact with the interlocking member 1 urged in the rotation direction α by the return spring 3, the positioning of the interlocking member 1 in the radial direction by the guide portion 4*b*, the locking of the return spring 3 by the locking portion 4*a*, and the holding of the holding member 4 to the interlocking member 1 by the holding portion 4*c* can be performed together. In particular, since the holding member 4 according to the present embodiment is formed of a plate-like member, the thickness of the throttle grip device can be reduced.

Moreover, since the return spring 3 according to the present embodiment urges the interlocking member 1 in the axial direction β in addition to the rotation direction α, the return spring 3 can press the interlocking member 1 while having elasticity in the axial direction β to absorb backlash. As a result, the interlocking member 1 can be stably rotated, and the operability of the throttle grip G can be maintained. Further, since the interlocking member 1 according to the present embodiment is separate from the throttle grip G, an excessive load applied to the throttle grip G can be prevented from being transmitted to the interlocking member, and the replacement of the interlocking member 1 or the throttle grip G can be facilitated.

In addition, according to the present embodiment, the interlocking member 1 has the accommodation recess 1*b* for accommodating the return spring 3. The throttle grip device includes the holding member 4 which is attached to the interlocking member 1 while locking the other end 3*b* of the return spring 3 accommodated in the accommodation recess 1*b* and integrates the interlocking member 1 and the return spring 3. Therefore, the interlocking member 1 and the return spring 3 can be integrated to improve the workability in assembly, and the width dimension required for assembling the interlocking member 1 and the return spring 3 can be reduced.

Further, since the holding member 4 according to the present embodiment has the locking portion 4*a* for locking the other end 3*b* of the return spring 3, and the holding portion 4*c* held in contact with the interlocking member 1 urged in the rotation direction α by the return spring 3, the urging force by the return spring 3 can be reliably applied to the interlocking member 1, and the integrated structure of the interlocking member 1 and the return spring 3 can be reliably held. Furthermore, since the holding member 4 according to the present embodiment is attached to the interlocking member 1 while closing the accommodation recess 1*b*, foreign matters and the like can be prevented from entering the accommodation recess 1*b*, and the urging force by the return spring 3 can be applied to the interlocking member 1.

Subsequently, a second embodiment of the present invention will be described.

Figure 14:
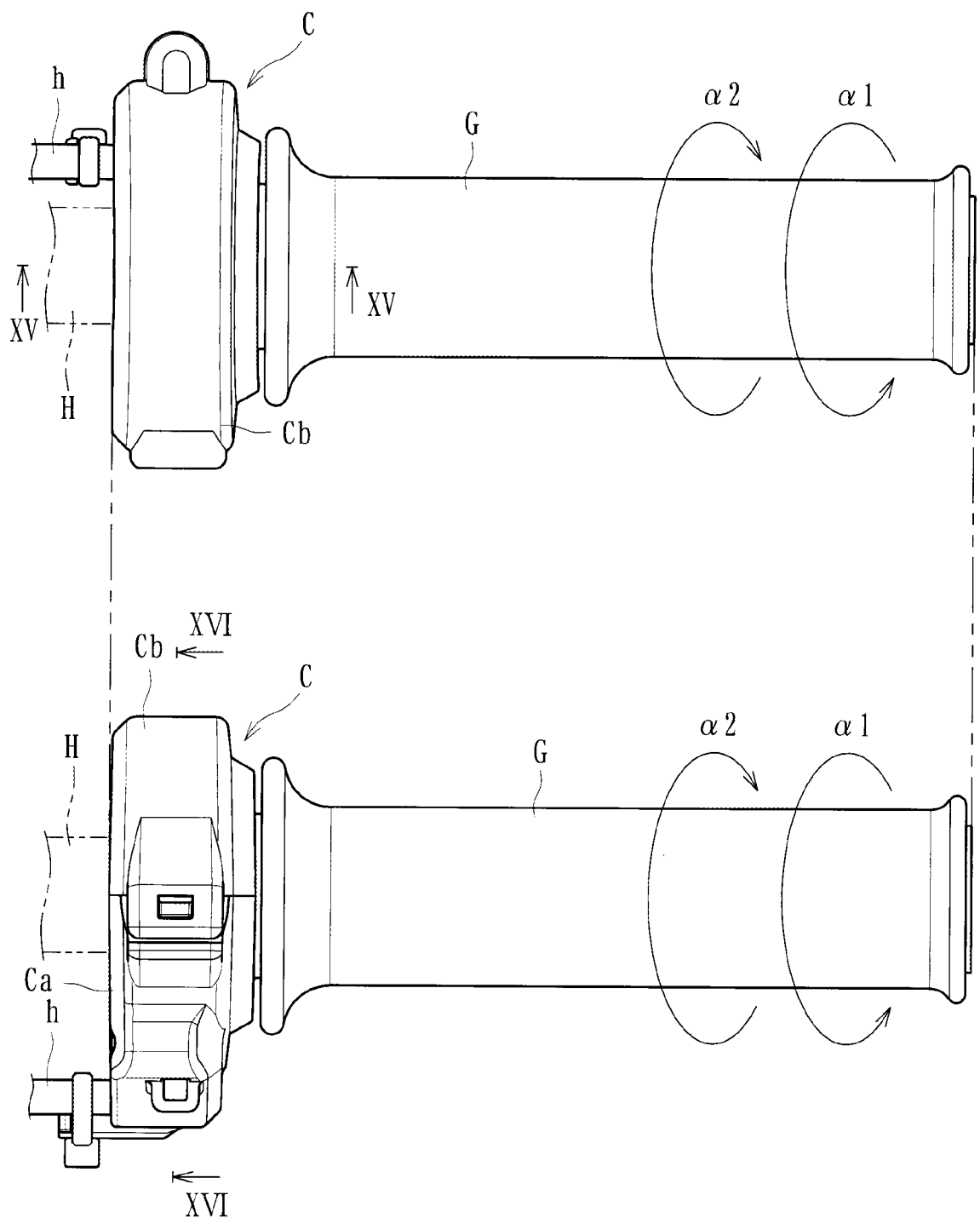
FIG. 14 is a front view and a side view showing an appearance of a throttle grip device according to a second embodiment of the present invention.

As shown in FIG. 14, a throttle grip device according to the present embodiment is configured to detect a rotation angle of the throttle grip G attached to the handle pipe H of a two-wheeled vehicle and transmit a detected signal to an electronic control device such as an ECU mounted to the two-wheeled vehicle. As shown in FIGS. 14 to 20, the throttle grip device includes the interlocking member 1, the magnetic sensor 2 (rotation angle detecting unit), the return spring 3, the holding member 4, a slide member 5, a reverse-rotation return spring 6, and the case C.

Figure 17:
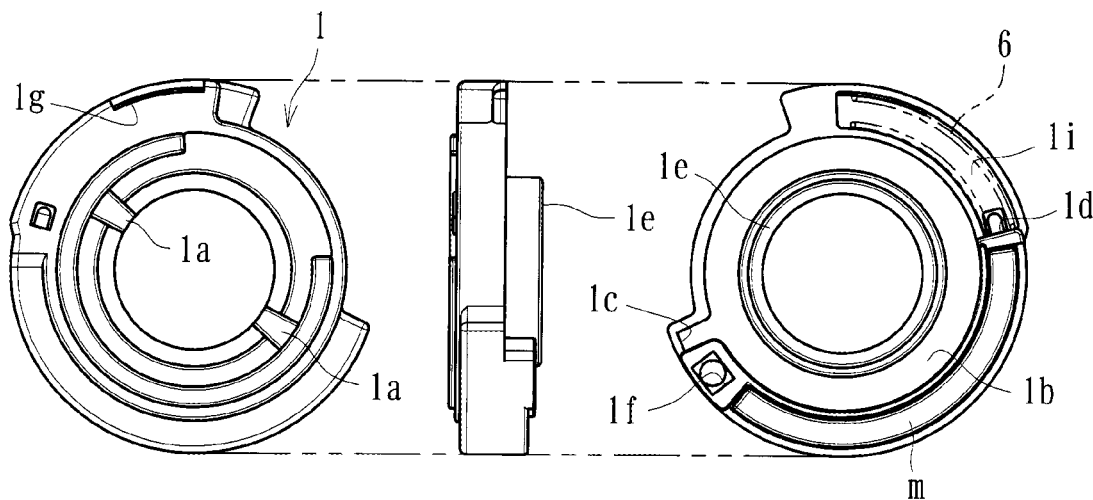
FIG. 17 is a three-side view showing an interlocking member of the throttle grip device.
Figure 18:
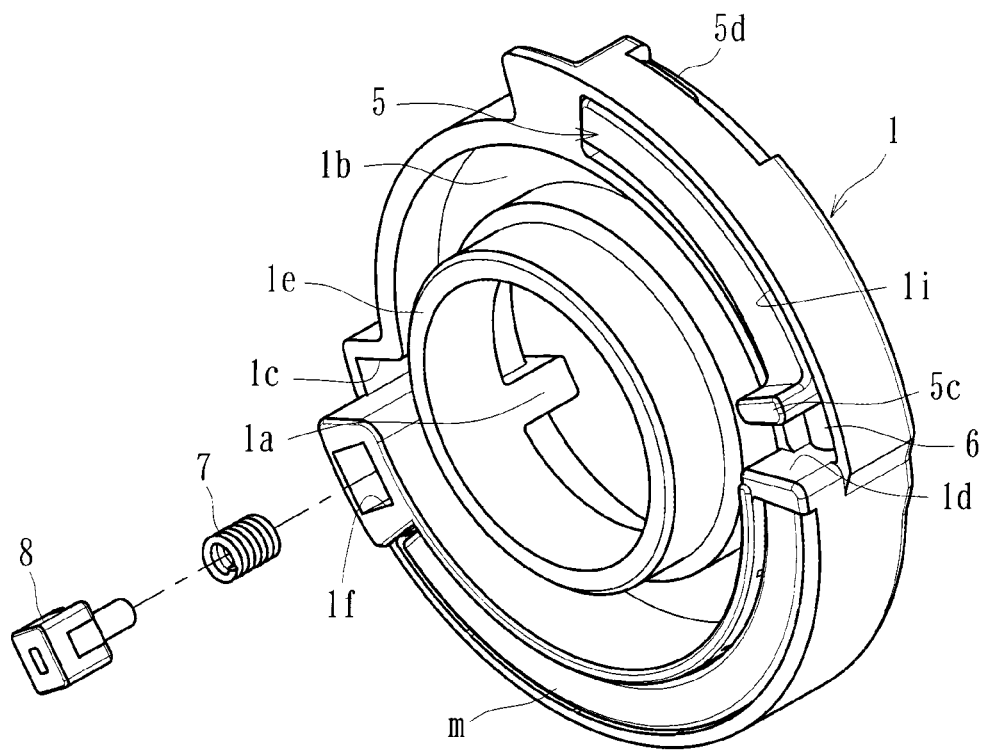
FIG. 18 is a perspective view showing the interlocking member.

The interlocking member 1 can rotate with the rotational operation of the throttle grip G of the vehicle. As shown in FIGS. 17 and 18, the interlocking member 1 is made of a substantially cylindrical resin molded product. The interlocking member 1 has the fitted portion 1*a* into which the fitting portion Ga (see FIG. 15) of the throttle grip G can be fitted, the accommodation recess 1*b* for accommodating the return spring 3, the locking portion 1*c* for locking the one end 3*a* of the return spring 3, and the stopper portion 1*d* protruding at a predetermined position.

Further, the interlocking member 1 according to the present embodiment has one end surface to which the arc-shaped magnet m is attached. The magnet m is configured such that the magnetic field continuously changes in the circumferential direction. The magnet m can rotate with the rotation of the interlocking member 1. The magnet m may have a helical surface whose height continuously changes while bending in an arc shape. In that case, it is necessary to place the magnetic sensor 2 (rotation angle detecting unit) so as to face the helical surface in a state of being attached to the interlocking member 1.

Figure 19:
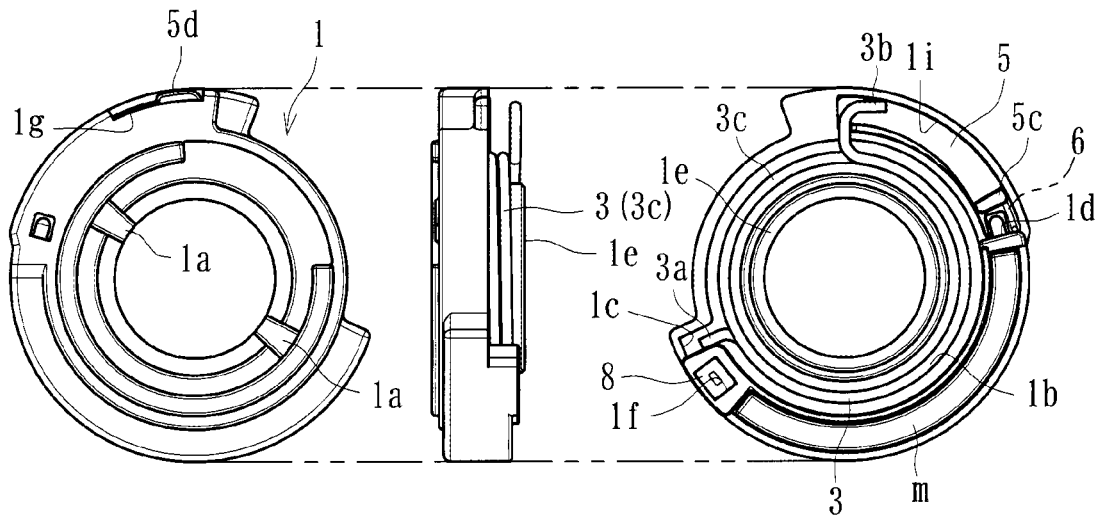
FIG. 19 is a three-side view showing a state in which a return spring and a slide member are assembled to the interlocking member.
Figure 20:
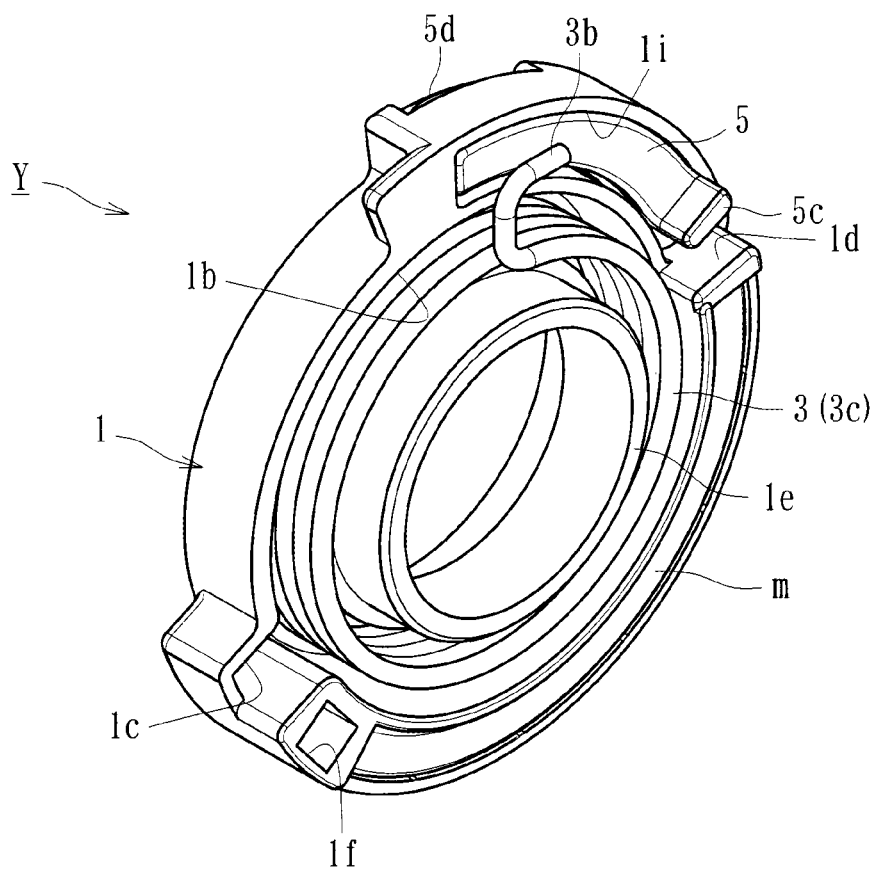
FIG. 20 is a perspective view showing a state in which the return spring and the slide member are assembled to the interlocking member.

Furthermore, the accommodation recess 1*b* has a groove shape formed in an annular shape on the one end surface of the interlocking member 1. The locking portion 1*c* is formed continuously with a part of the accommodation recess 1*b*. In addition, when the return spring 3 is accommodated in the accommodation recess 1*b*, the return spring 3 is locked in such a manner that the coil portion 3*c* is fitted into the accommodation recess 1*b* and the one end 3*a* is fitted into the locking portion 1*c*, as shown in FIGS. 19 and 20. In this way, the return spring 3 is provided in the interlocking member 1, so that the width dimension can be reduced.

The throttle grip G according to the present embodiment can be gripped by a driver and can be rotationally operated with respect to the handle pipe H (see FIG. 16) of the two-wheeled vehicle. As shown in FIG. 14, the throttle grip G can be rotationally operated both in a forward direction (α1) for rotating in a direction toward the driver and in a reverse direction (α2) for rotating in a direction away from the driver. Further, in the present embodiment, the return spring 3 urges the throttle grip G and the interlocking member 1 in the rotation direction toward their initial positions when the throttle grip G is rotationally operated in the forward direction α1, and the reverse-rotation return spring 6 urges the throttle grip G and the interlocking member 1 in the rotation direction toward their initial positions when the throttle grip G is rotationally operated in the reverse direction α2.

Similarly to the first embodiment, the return spring 3 is configured by a torsion coil spring that urges the throttle grip G and the interlocking member 1 in the rotation angle toward their initial positions when the throttle grip G is rotated in the forward direction α1. As shown in FIG. 9, the return spring 3 has the one end 3a locked to the locking portion 1c of the interlocking member 1, the other end 3b locked to the locking portion 4a of the holding member 4, and the coil portion 3c located between the one end 3a and the other end 3b.

Thus, the return spring 3 is assembled in such a manner that the one end 3a is attached to the interlocking member 1 and the other end 3b is attached to the holding member 4. When the throttle grip G is rotated in the forward direction α1, the interlocking member 1 rotates against the urging force of the return spring 3. Therefore, the urging force is transmitted to the throttle grip G, and a force acts to return the throttle grip G and the interlocking member 1 to their initial positions.

The reverse-rotation return spring 6 is configured by a coil spring that urges the throttle grip G and the interlocking member 1 in the rotation direction toward their initial positions when the throttle grip G is rotationally operated in the reverse direction α2. The reverse-rotation return spring 6 is accommodated in an accommodation recess 1i (see FIG. 17) formed in an arc shape in the interlocking member 1. Further, as shown in FIGS. 19 and 20, the slide member 5 is attached to the accommodation recess 1i of the interlocking member 1. The reverse-rotation return spring 6 can be compressed with the movement of the slide member 5 to generate an urging force.

As shown in FIGS. 19 and 20, the slide member 5 is formed of an arc-shaped part extending in a circumferential direction of the interlocking member 1. As shown in FIGS. 24 to 27, the slide member 5 integrally includes an accommodation recess 5a for holding the reverse-rotation return spring 6, a spring receiving portion 5b for receiving one end of the reverse-rotation return spring 6, a contact portion 5c in contact with the holding portion 4c (see FIG. 23) of the holding member 4, and a protruding portion 5d inserted through a guide groove 1g (see FIG. 22) formed in the interlocking member 1.

Further, when the slide member 5 in a state where the reverse-rotation return spring 6 is held in the accommodation recess 5a is accommodated in the accommodation recess 1i of the interlocking member 1, one end of the reverse-rotation return spring 6 is in contact with the spring receiving portion 5b of the slide member 5, and the other end of the reverse-rotation return spring 6 is in contact with a wall portion of the accommodation recess 5a. In this way, when the throttle grip G is rotationally rotated in the reverse direction α2, the slide member 5 moves in the circumferential direction with respect to the interlocking member 1 to compress the reverse-rotation return spring 6, and the urging force generated by the compression of the reverse-rotation return spring 6 is applied to the throttle grip G. Therefore, a force acts to return the throttle grip G and the interlocking member 1 to their initial positions.

Further, when the slide member 5 is assembled to the accommodation recess 1i of the interlocking member 1, the protruding portion 5d of the slide member 5 is inserted through the guide groove 1g of the interlocking member 1. When the throttle grip G is rotationally operated in the reverse direction α2, the protruding portion 5d moves along the guide groove 1g, and thus, the movement of the slide member 5 is guided by the guide groove 1g. In this way, the movement of the slide member 5 can be performed smoothly and correctly.

Figure 15:
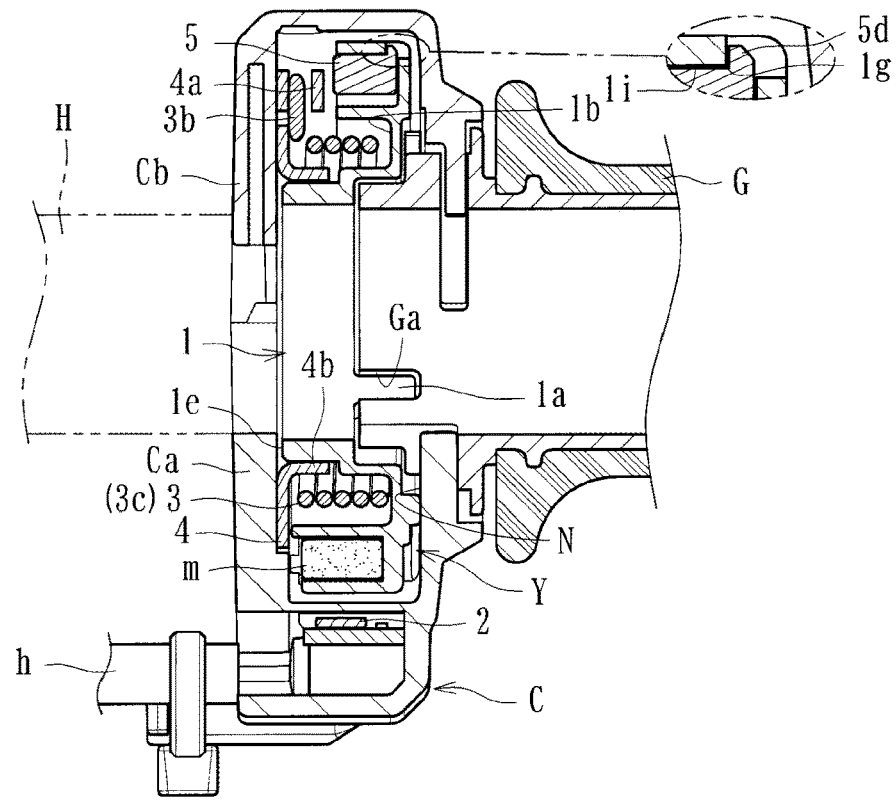
FIG. 15 is a sectional view taken along the line XV-XV in FIG. 14.
Figure 16:
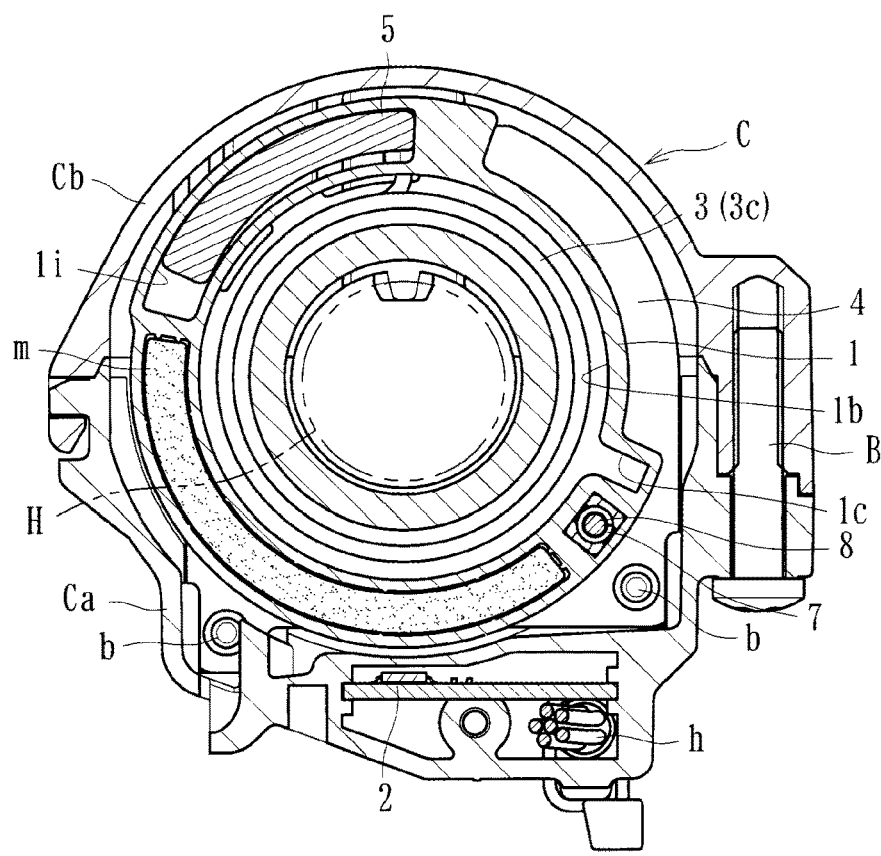
FIG. 16 is a sectional view taken along the line XVI-XVI in FIG. 14.

As shown in FIGS. 15 and 16, the magnetic sensor 2 (rotation angle detecting unit) is configured by a sensor disposed at a predetermined position of the lower case Ca.

The magnetic sensor 2 can detect a change in magnetism generated from the magnet m, thereby detecting a rotation angle of the interlocking member 1 and detecting a rotation angle of the throttle grip G. Specifically, the magnetic sensor 2 can obtain an output voltage according to a change in the magnetic field of the magnet m (change in magnetic flux density). For example, the magnetic sensor 2 is configured by a Hall element (specifically, a linear Hall IC capable of obtaining an output voltage proportional to the magnetic field (magnetic flux density) of the magnet m) that is a magnetic sensor using the Hall effect. Thus, when the magnet m rotates as the interlocking member 1 rotates due to the rotation of the throttle grip G, the magnetism changes.

In this way, since the magnetism changes depending on the rotation angle of the interlocking member 1, an output voltage corresponding to the rotation angle can be obtained, and the rotation angle of the interlocking member 1 (i.e., the rotation angle of the throttle grip G) can be detected based on the output voltage. The rotation angle of the throttle grip G detected in this manner is transmitted as an electric signal to an ECU (Engine Control Unit) mounted to the two-wheeled vehicle, and an engine of the vehicle can be controlled according to the transmitted rotation angle of the throttle grip G. Meanwhile, the reference numeral "h" in the drawings represents a wiring extending from the magnetic sensor 2, and the detection signal is transmitted to the vehicle side via the wiring h.

Further, the magnetic sensor 2 according to the present embodiment can detect a rotational operation of the throttle grip G in the forward direction α1 and the reverse direction α2. In this way, when a driver grips and rotationally operates the throttle grip G in the forward direction α1 from the initial position, an engine E can be controlled according to the rotation angle of the throttle grip G, and the running at any speed can be performed. Further, when the throttle grip G is rotationally operated in the reverse direction α2 from the initial position, electrical components (e.g., cruise control cancel function, etc.) mounted on the vehicle can be activated or deactivated.

Furthermore, as shown in FIGS. 17 to 20, the return spring 3 is attached to the inner diameter side of the interlocking member 1 according to the present embodiment, and the reverse-rotation return spring 6 is attached to the portion of the interlocking member 1 on the outer diameter side from the attachment position of the return spring 3. Further, the magnet m and the slide member 5 are arranged side by side in the circumferential direction of the interlocking member 1. Further, the interlocking member 1 according to the present embodiment has a spring 7 and a pressing part 8 attached thereto in the circumferential direction in which the magnet m and the slide member 5 are arranged side by side. The interlocking member 1 is configured such that the pressing part 8 is urged toward the holding member 4 by the urging force of the spring 7. In this way, at the time of rotation of the interlocking member 1, a desired frictional force is applied to improve the operation feeling.

Similarly to the first embodiment, the holding member 4 rotatably holds the interlocking member 1 while positioning the same, and holds the other end 3b of the return spring 3 while locking the same. As shown in FIG. 10, the holding member 4 is formed of a metallic plate-like member that includes the locking portion 4a for locking the other end 3b of the return spring 3, the guide portion 4b for positioning and holding the interlocking member 1, and the holding portion 4c formed at a predetermined position. Meanwhile, the screw hole n is formed at a predetermined position of the holding member 4, and the holding member 4 can be screwed to a predetermined position in the lower case Ca.

The locking portion 4a is formed of a portion obtained by bending a part of the holding member 4, and is configured to reliably lock the other end 3b of the return spring 3. The guide portion 4b is formed of a portion obtained by protruding a part of the holding member 4 in an annular shape by burring or the like. As shown in FIG. 15, the guide portion 4b can be rotatably fitted with the interlocking member 1 by inserting the annular wall portion 1e (see FIG. 20) integrally formed with the interlocking member 1 through the guide portion 4b, thereby positioning (especially, positioning in the radial direction) the interlocking member 1.

Figure 22:
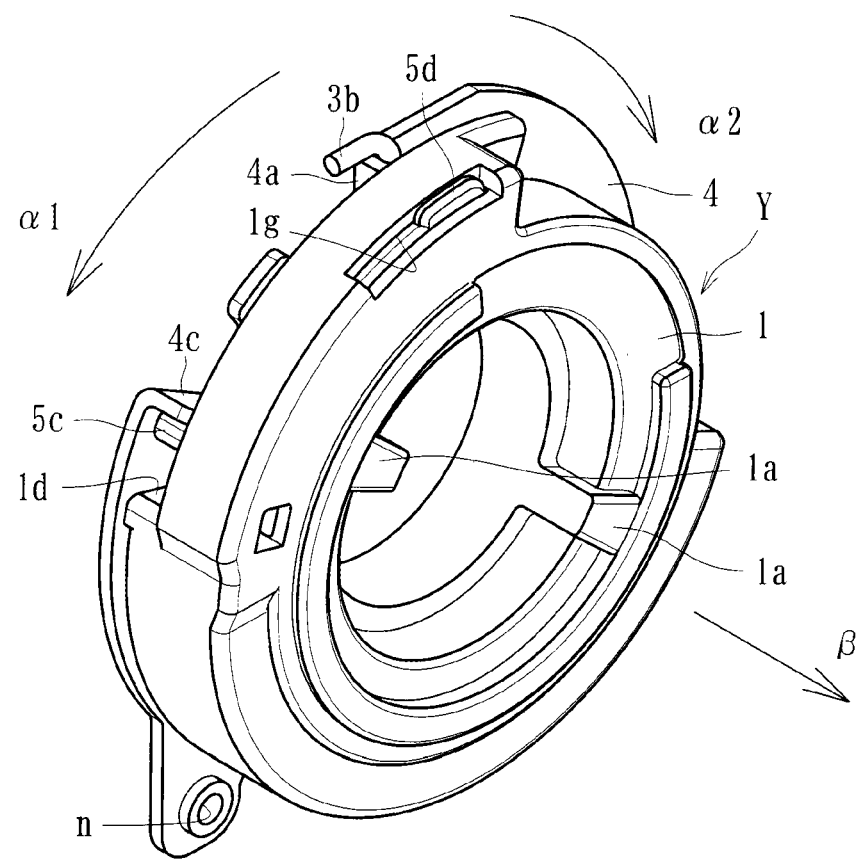
FIG. 22 is a perspective view showing a state in which the interlocking member, the return spring and the reverse-rotation return spring are integrated by the holding member.
Figure 23:
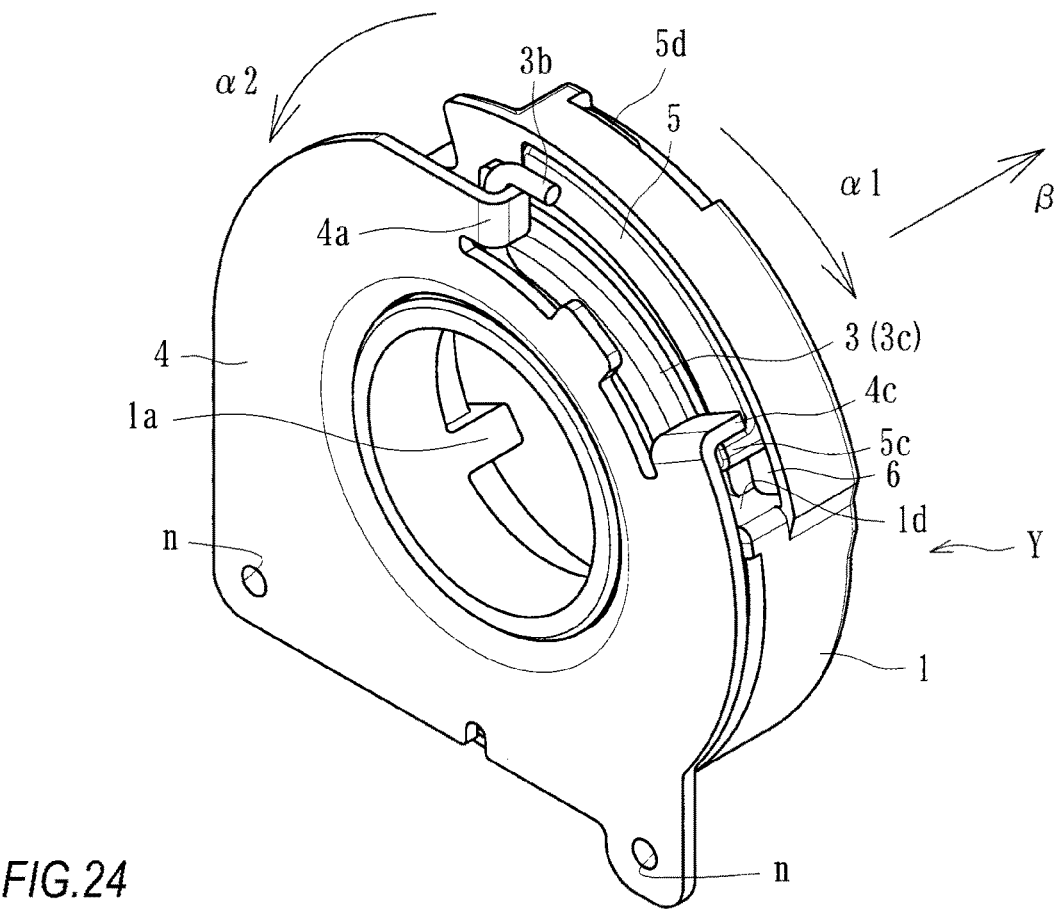
FIG. 23 is a perspective view showing a state in which the interlocking member, the return spring and the reverse-rotation return spring are integrated by the holding member.
Figure 24:
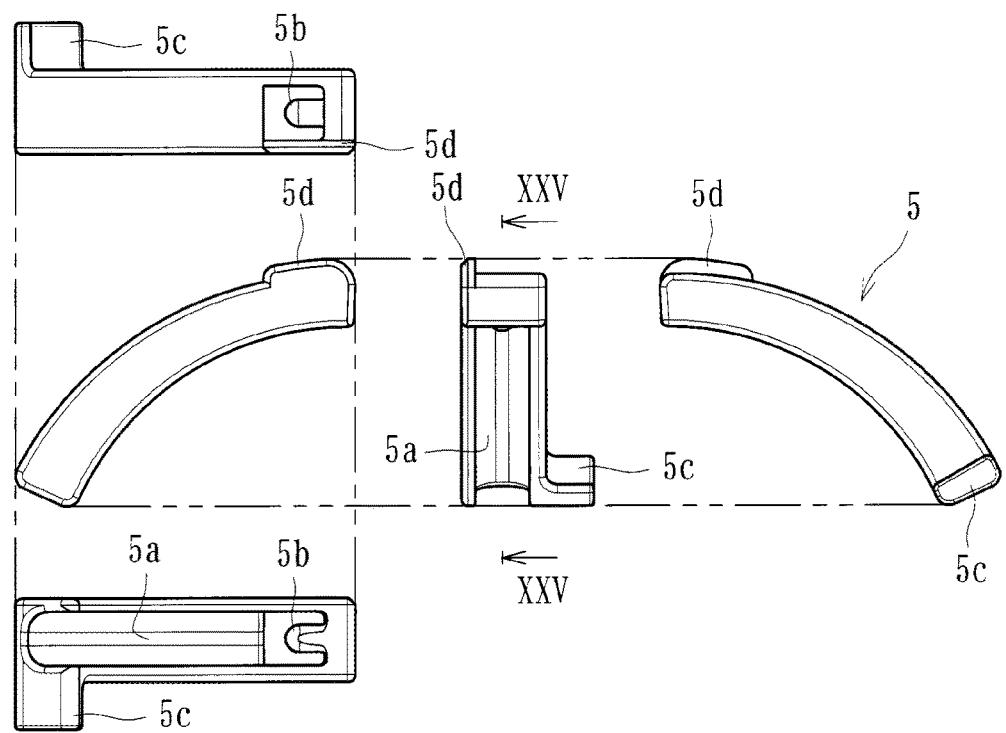
FIG. 24 is a five-side view showing the slide member of the throttle grip device.
Figure 25:
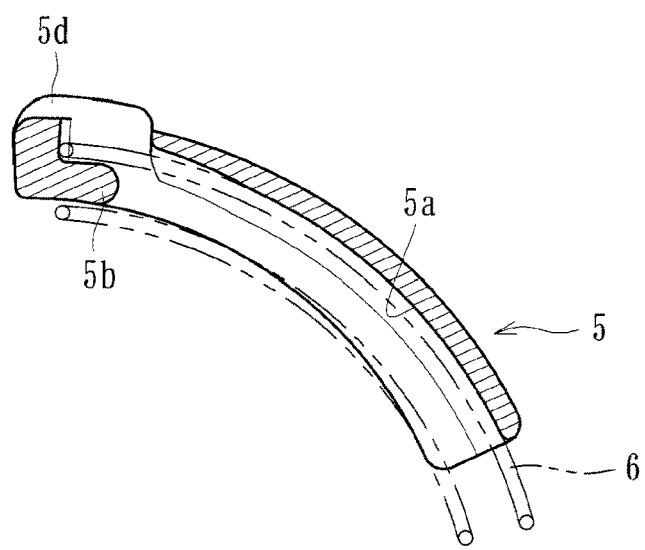
FIG. 25 is a sectional view taken along the line XXV-XXV in FIG. 24.
Figure 26:
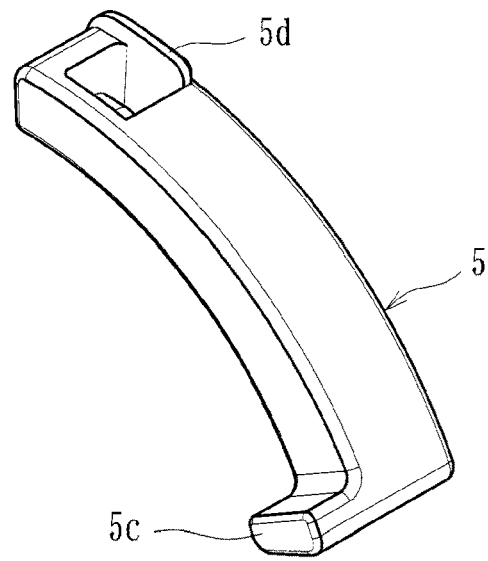
FIG. 26 is a perspective view showing the slide member.
Figure 27:
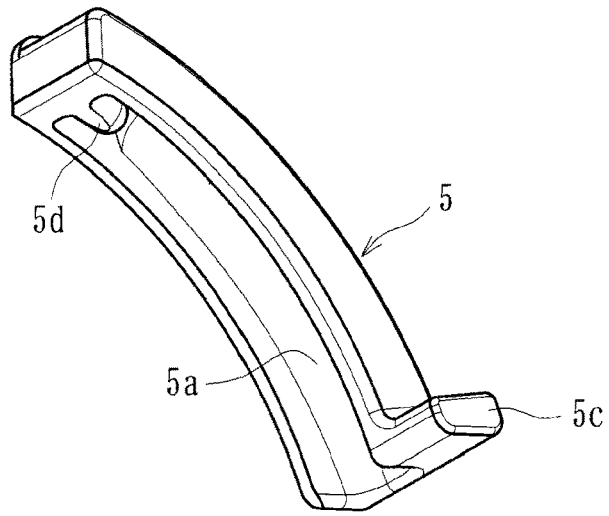
FIG. 27 is a perspective view showing the slide member.

As shown in FIGS. 22 and 23, the holding portion 4c is formed of a portion that comes into contact with the contact portion 5c of the slide member 5 and holds the slide member 5 in the circumferential direction. When the throttle grip G is rotationally operated in the reverse direction α2 and the interlocking member 1 is rotated in the same direction, the holding portion 4c locks the slide member 5 and restricts the rotation of the slide member 5 in the same direction, so that the interlocking member 1 and the slide member 5 can be relatively moved. In this way, when the throttle grip G is rotationally operated in the reverse direction α2, the interlocking member 1 and the slide member 5 are relatively moved to compress the reverse-rotation return spring 6, and the urging force generated by the compression of the reverse-rotation return spring 6 is applied to the throttle grip G. Meanwhile, when the throttle grip G is rotationally operated by a predetermined angle in the reverse direction α2, the stopper portion 1d of the interlocking member 1 comes into contact with the contact portion 5c locked by the holding portion 4c, and further rotational operation of the slide member 5 is restricted.

On the other hand, when the throttle grip G is rotationally operated in the reverse direction α2, the urging force of the return spring 3 is generated in a direction opposite to the urging force generated by the reverse-rotation return spring 6. However, since the urging force of the reverse-rotation return spring 6 is set to be larger than that of the return spring 3, only the urging force of the reverse-rotation return spring 6 is applied to the interlocking member 1 and the throttle grip G. Meanwhile, when the throttle grip G is rotationally operated in the forward direction α1, the contact portion 5c of the slide member 5 moves in a direction away from the holding portion 4c. Therefore, the slide member 5 rotates together with the interlocking member 1, and the urging force by the reverse-rotation return spring 6 is not generated.

Additionally, in the present embodiment, in a state where the return spring 3 is accommodated in the accommodation recess 1b, the other end 3b of the return spring 3 is locked to the locking portion 4a of the holding member 4. Thereafter, the coil portion 3c of the return spring 3 is twisted to relatively rotate the holding member 4 and the interlocking member 1 by a certain angle in a direction in which a predetermined urging force is generated, and the holding portion 4c of the holding member 4 comes into contact with the contact portion 5c of the slide member 5.

By the way, the return spring 3 according to the present embodiment has a lower initial setting load than the reverse-rotation return spring 6. Therefore, in the contact state of the contact portion 5c and the holding portion 4c, the reverse-rotation return spring 6 is not compressed, and the holding portion 4c of the holding member 4 receives the urging force of the return spring 3. As a result, the holding member 4 can hold the interlocking member 1 urged by the return spring 3.

Figure 21:
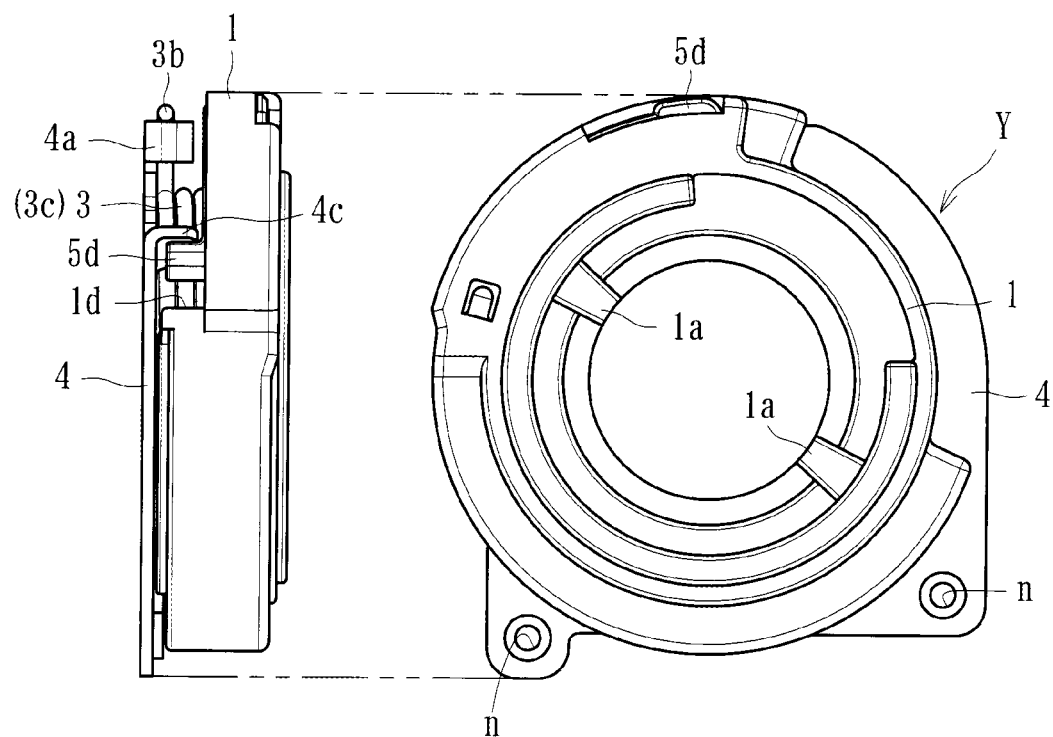
FIG. 21 is a plan view and a side view showing a state in which the interlocking member, the return spring and a reverse-rotation return spring are integrated by the holding member.

In this way, the holding member 4 locks the other end 3b of the return spring 3 accommodated in the accommodation recess 1b, and holds the interlocking member 1 with a predetermined urging force. Therefore, as shown in FIGS. 21 to 23, the interlocking member 1, the return spring 3 and the reverse-rotation return spring 6 are integrated. Thus, the interlocking member 1, the return spring 3 and the reverse-rotation return spring 6 integrated by the holding member 4 are referred to as the unit Y, and the unit Y is attached and fixed at a predetermined position in the case C, as shown in FIG. 15.

Furthermore, similarly to the first embodiment, the return spring 3 according to the present embodiment urges the interlocking member 1 in the axial direction β in addition to the rotation direction α (the direction toward the initial position when the throttle grip G is rotated in the forward direction α1). Specifically, as shown in FIG. 9, the return spring 3 according to the present embodiment is configured such that the coil portion 3c has a gap between adjacent windings. As shown in FIG. 15, when the return spring 3 is accommodated in the case C in a state (a state of the unit Y shown in FIGS. 21 to 23) of being integrated by the holding member 4, the return spring 3 is compressed in a direction in which the gap between the windings of the coil portion 3c becomes smaller, and urges the interlocking member 1 in the axial direction β.

In this way, the interlocking member 1 is assembled with one end surface pressed against an inner peripheral surface of the case C by the urging force of the return spring 3 in the axial direction β. Therefore, when the throttle grip G is rotationally operated, the interlocking member 1 rotates against the urging force of the return spring 3 or the reverse-rotation return spring 6, and the one end surface of the interlocking member 1 slides while being pressed against the inner peripheral surface of the case C.

Subsequently, a third embodiment of the present invention will be described.

Figure 28:
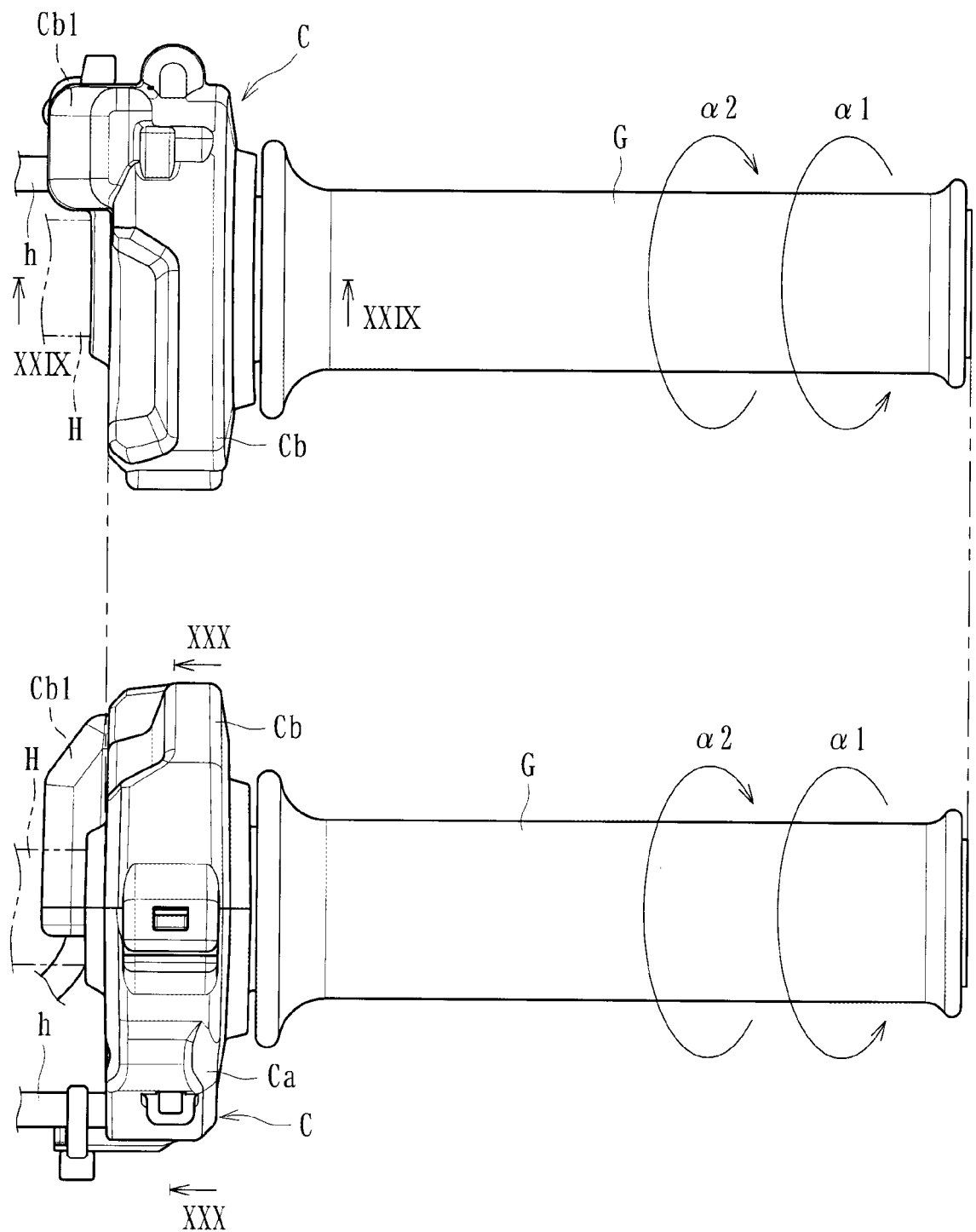
FIG. 28 is a front view and a side view showing an appearance of a throttle grip device according to a third embodiment of the present invention.

As shown in FIG. 28, a throttle grip device according to the present embodiment is configured to detect a rotation angle of the throttle grip G attached to the handle pipe H of a two-wheeled vehicle and transmit a detected signal to an electronic control device such as an ECU mounted to the two-wheeled vehicle. As shown in FIGS. 28 to 37, the throttle grip device includes the interlocking member 1, the magnetic sensor 2 (rotation angle detecting unit), the return spring 3, the holding member 4, the slide member 5, the reverse-rotation return spring 6, the case C, and a micro switch S.

Figure 34:
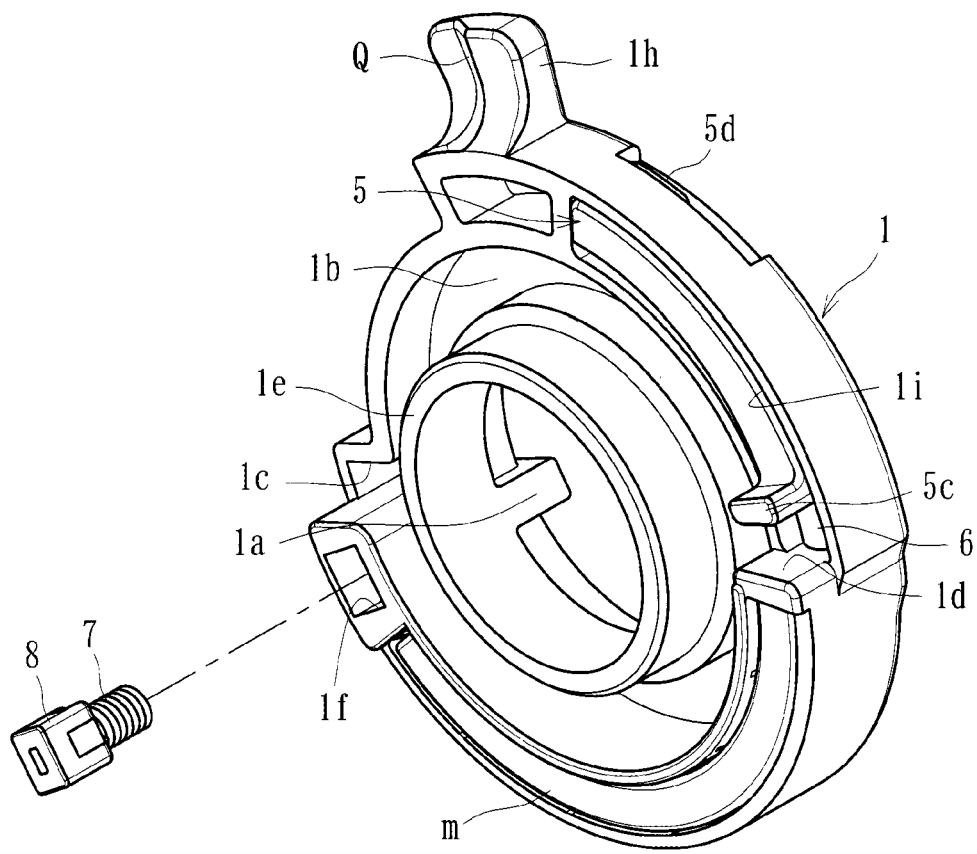
FIG. 34 is a perspective view showing the interlocking member.

The interlocking member 1 can rotate with the rotational operation of the throttle grip G of the vehicle. As shown in FIGS. 22 and 34, the interlocking member 1 is made of a substantially cylindrical resin molded product. The interlocking member 1 has the fitted portion 1a into which the fitting portion Ga (see FIG. 29) of the throttle grip G can be fitted, the accommodation recess 1b for accommodating the return spring 3, the locking portion 1c for locking the one end 3a of the return spring 3, and the stopper portion 1d protruding at a predetermined position.

Further, the interlocking member 1 according to the present embodiment has one end surface to which the arc-shaped magnet m is attached. The magnet m is configured such that the magnetic field continuously changes in the circumferential direction. The magnet m can rotate with the rotation of the interlocking member 1. The magnet m may have a helical surface whose height continuously changes while bending in an arc shape. In that case, it is necessary to place the magnetic sensor 2 (rotation angle detecting unit) so as to face the helical surface in a state of being attached to the interlocking member 1.

Figure 35:
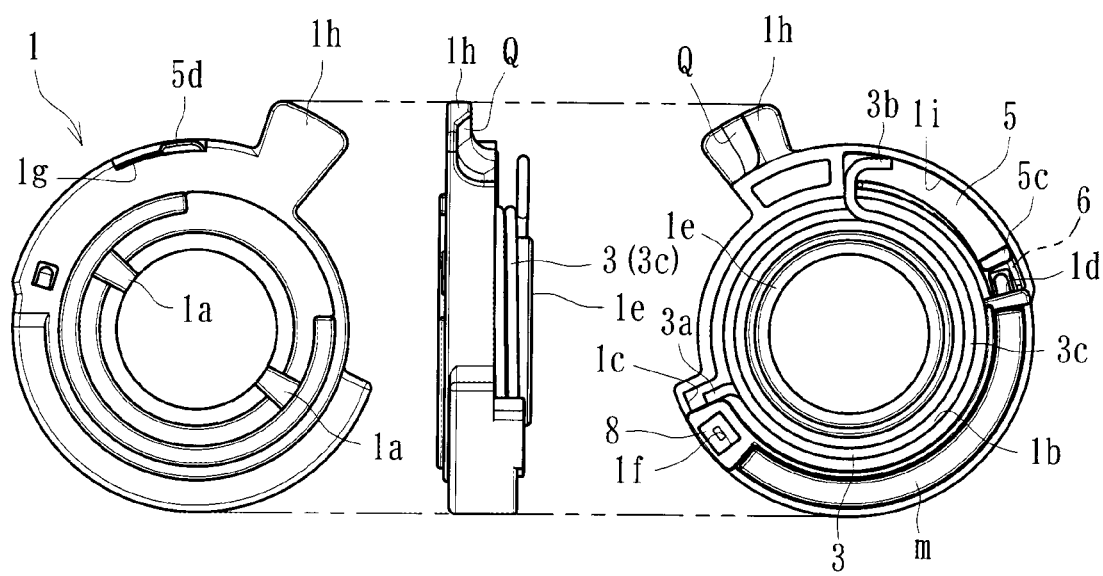
FIG. 35 is a three-side view showing a state in which a return spring and a slide member are assembled to the interlocking member.
Figure 36:
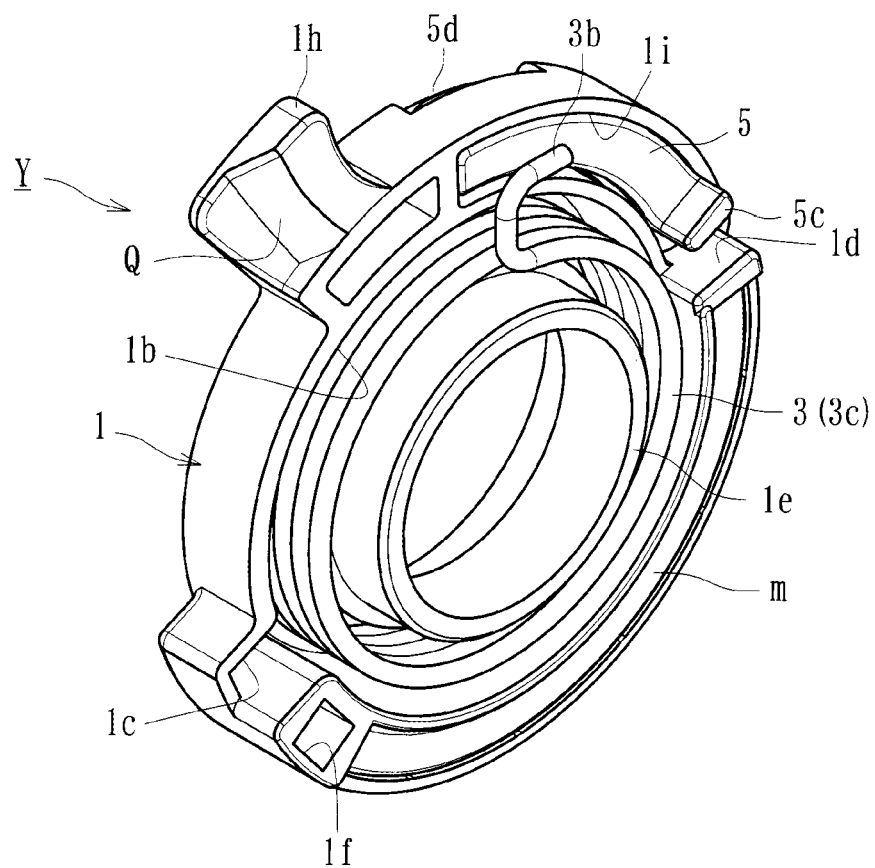
FIG. 36 is a perspective view showing a state in which the return spring and the slide member are assembled to the interlocking member.
Figure 37:
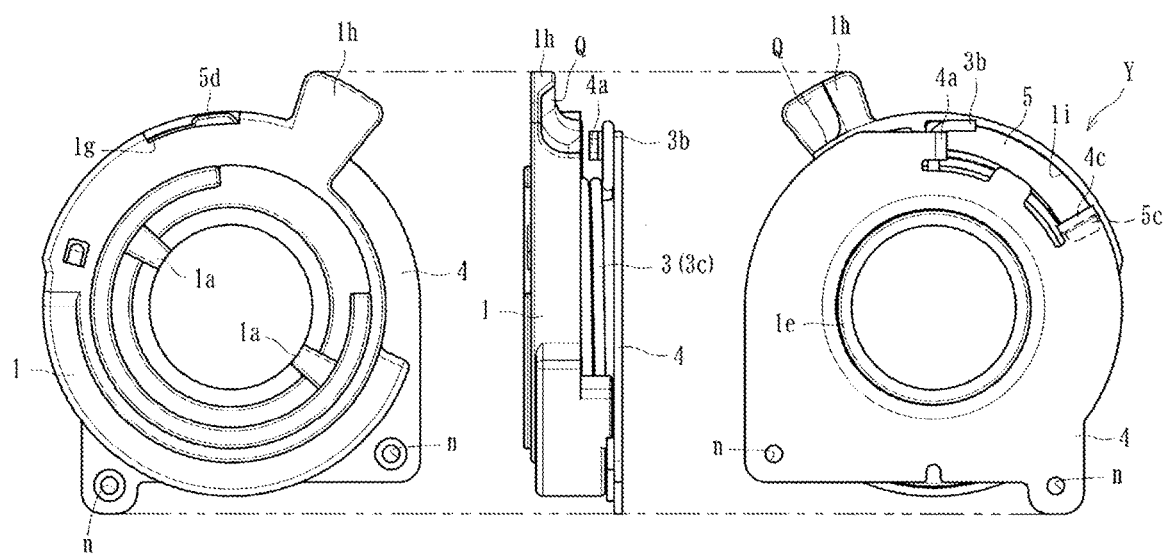
FIG. 37 is a three-side view showing a state in which the interlocking member, the return spring and a reverse-rotation return spring are integrated by the holding member.
Figure 38:
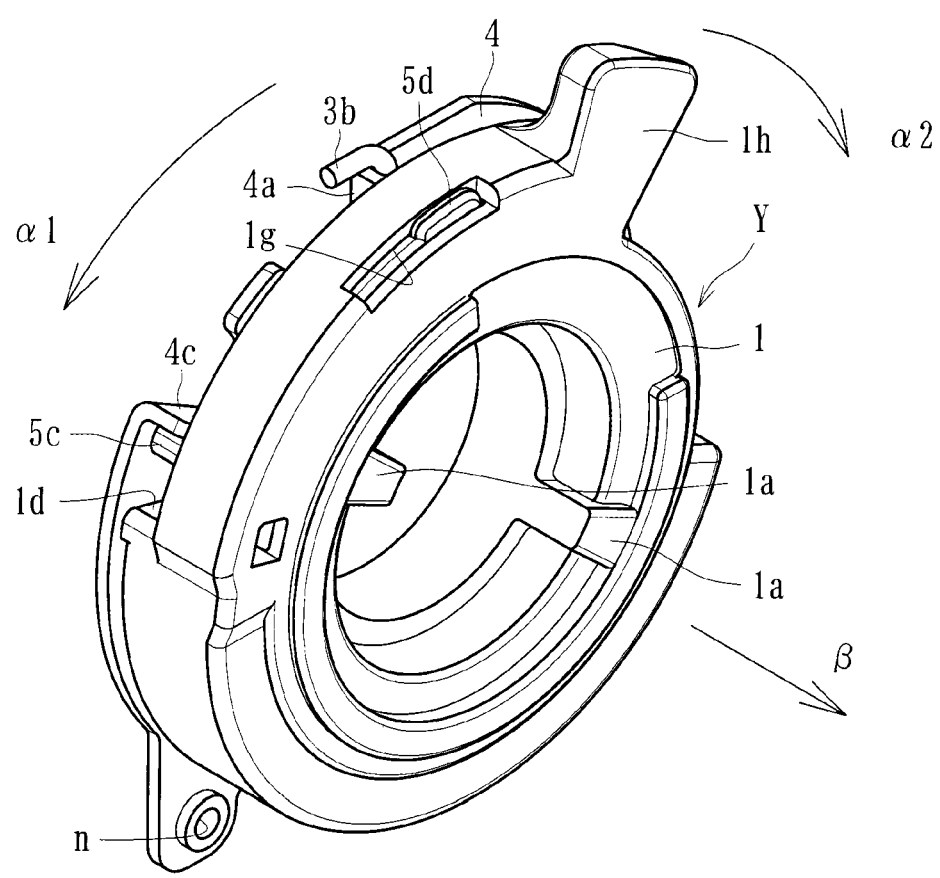
FIG. 38 is a perspective view showing a state in which the interlocking member, the return spring and the reverse-rotation return spring are integrated by the holding member.
Figure 39:
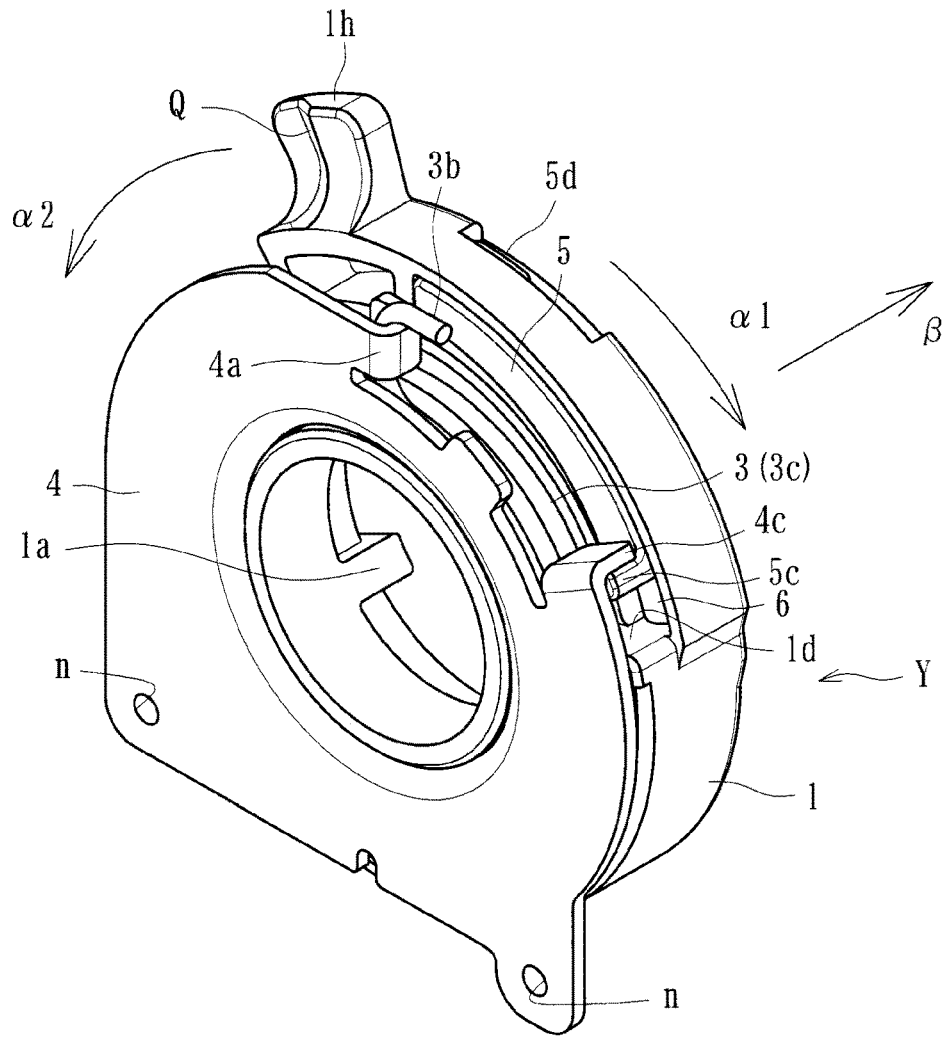
FIG. 39 is a perspective view showing a state in which the interlocking member, the return spring and the reverse-rotation return spring are integrated by the holding member.

Furthermore, the accommodation recess 1*b* has a groove shape formed in an annular shape on the one end surface of the interlocking member 1. The locking portion 1*c* is formed continuously with a part of the accommodation recess 1*b*. In addition, when the return spring 3 is accommodated in the accommodation recess 1*b*, the return spring 3 is locked in such a manner that the coil portion 3*c* is fitted into the accommodation recess 1*b* and the one end 3*a* is fitted into the locking portion 1*c*, as shown in FIGS. 35 and 36. In this way, the return spring 3 is provided in the interlocking member 1, so that the width dimension can be reduced.

Figure 40:
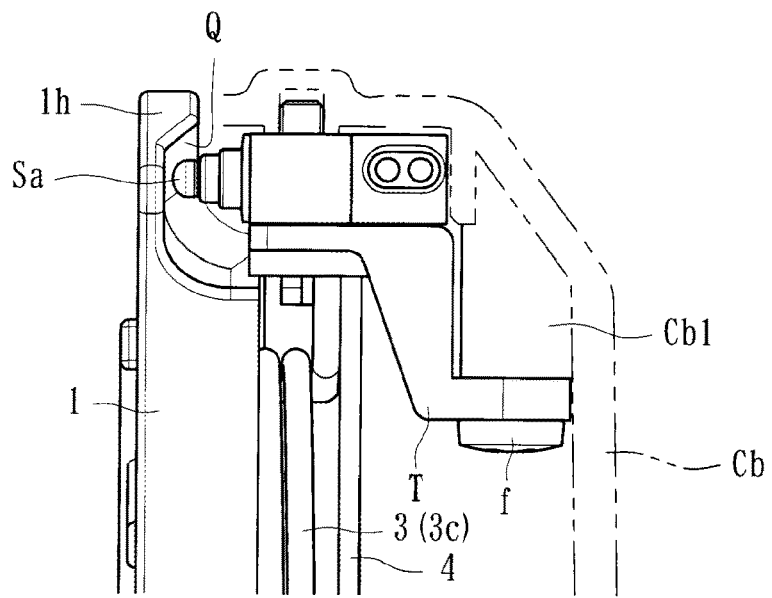
FIG. 40 is a schematic view showing a mounting state of a micro switch of the throttle grip device.

Furthermore, as shown in FIGS. 33 to 37, the interlocking member 1 according to the present embodiment has a protruding portion 1*h* formed to integrally protrude in an outer diameter direction. The protruding portion 1*h* has an inclined surface Q formed on one surface. As shown in FIG. 40, an operating portion Sa of the micro switch S attached to the upper case Cb can be pressed by the inclined surface Q. That is, a mounting part T is fixed to a mounting portion Cb 1 formed at a predetermined position of the upper case Cb by a mounting bolt f. The micro switch S is attached to the mounting part T.

Figure 41:
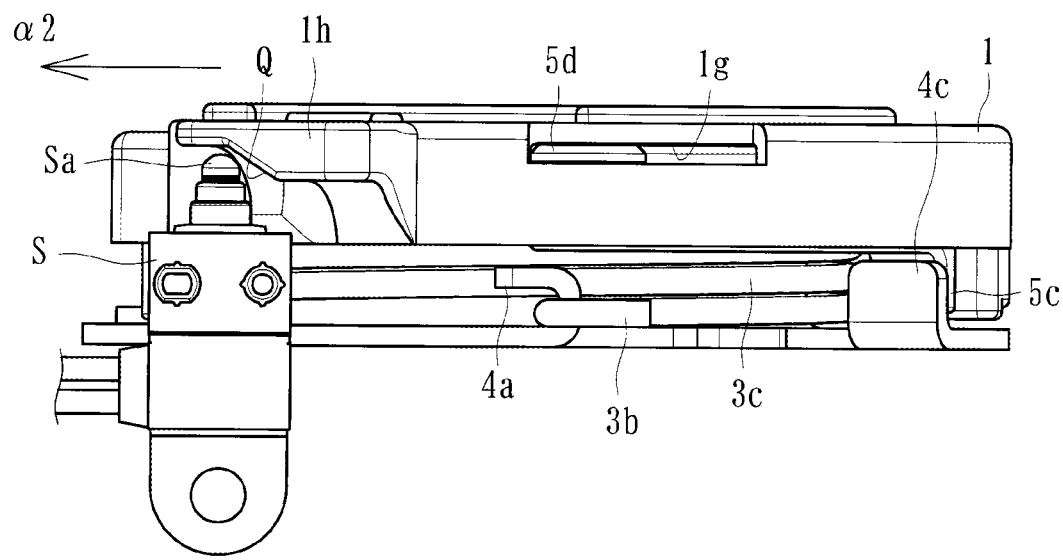
FIG. 41 is a side view showing a mounting state of the micro switch of the throttle grip device.

The micro switch S according to the present embodiment includes the operating portion Sa that can be operated while projecting and retracting. As shown in FIG. 41, the micro switch S is mounted such that the operation direction of the operating portion Sa is perpendicular to one surface of the protruding portion 1*h*. Further, when the interlocking member 1 rotates in the reverse direction α2, the operating portion Sa of the micro switch S retreats by being pressed by the inclined surface Q, and the micro switch S is electrically turned on.

Figure 30:
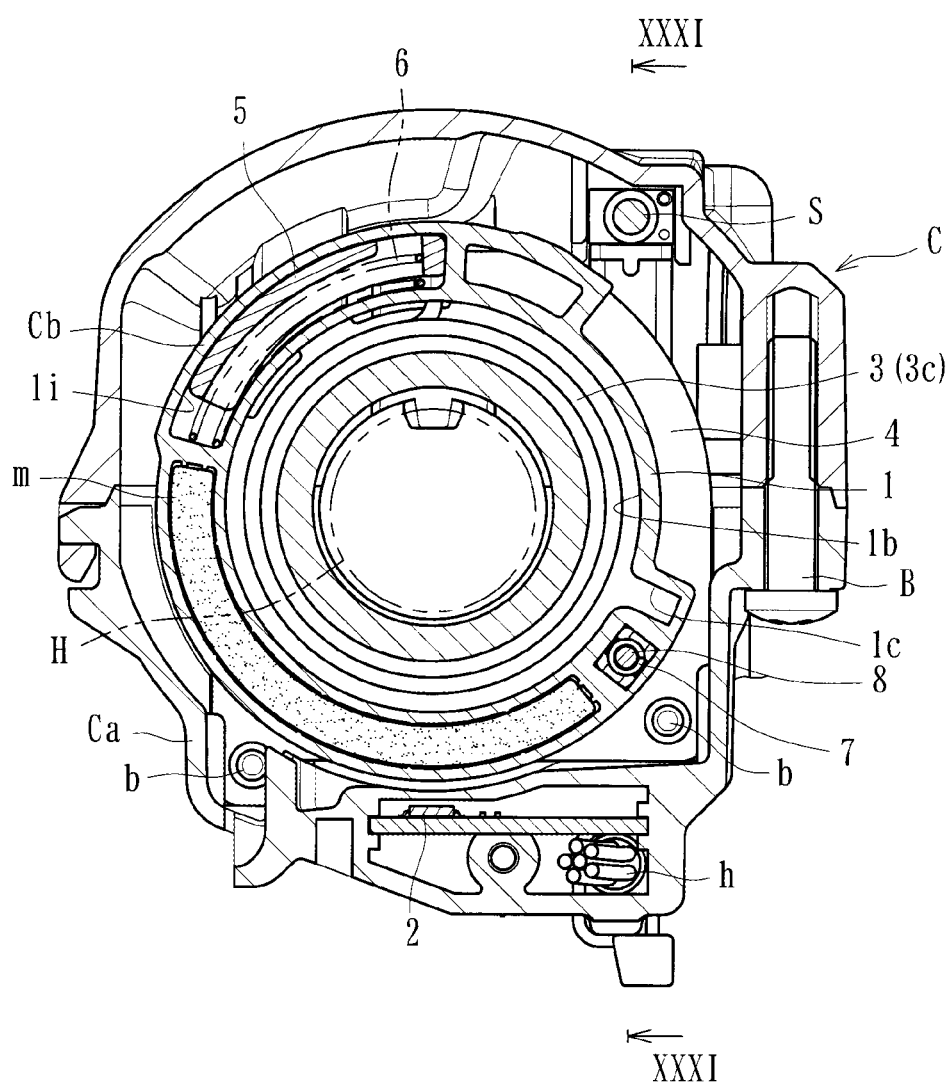
FIG. 30 is a sectional view taken along the line XXX-XXX in FIG. 28.
Figure 31:
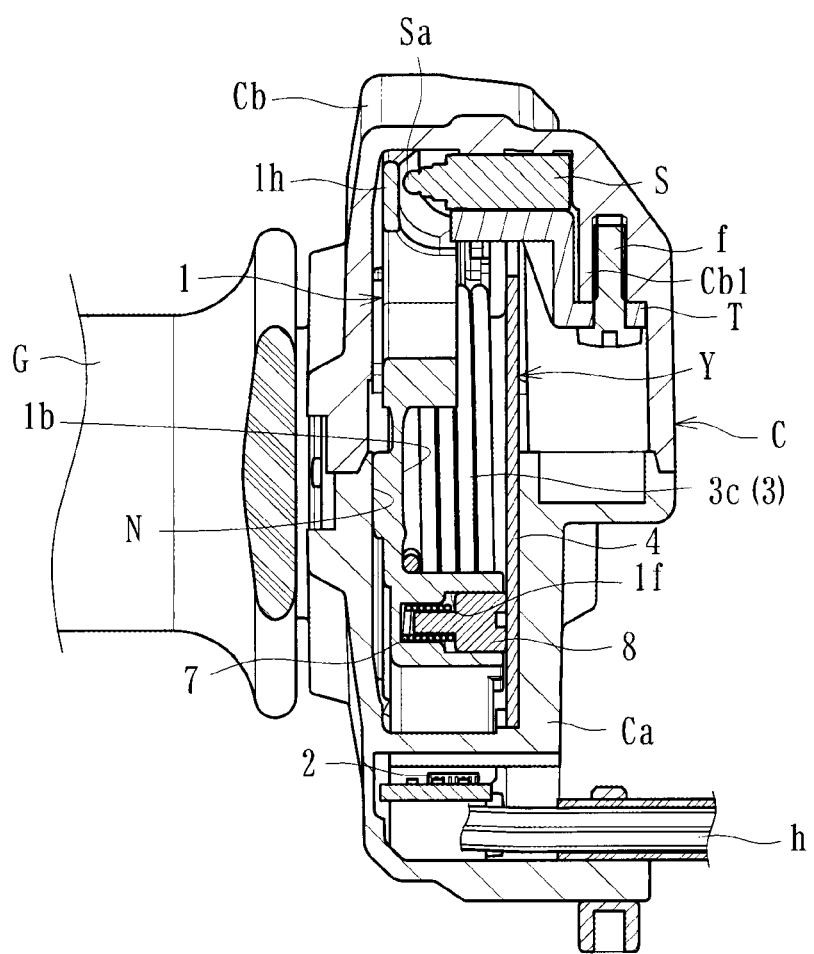
FIG. 31 is a sectional view taken along the line XXXI-XXXI in FIG. 30.
Figure 32:
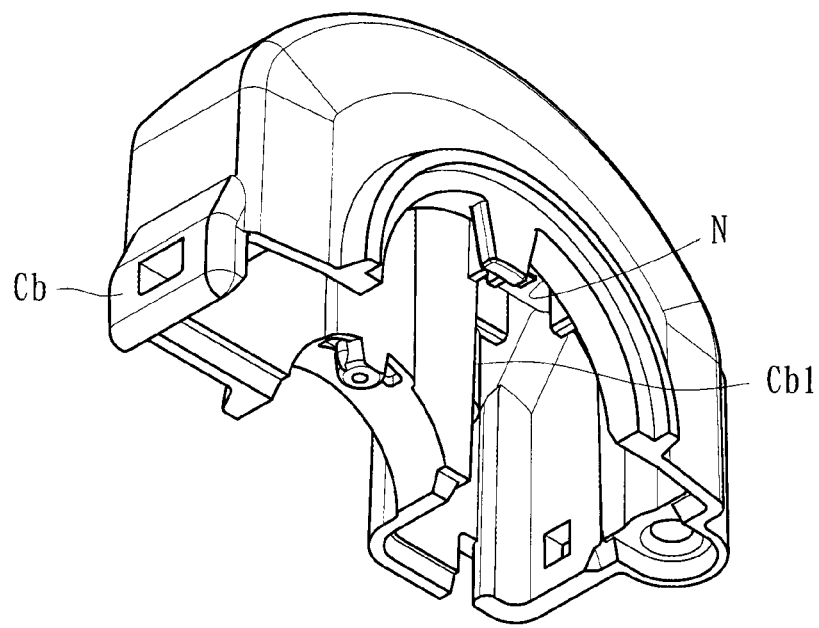
FIG. 32 is a perspective view showing a case of the throttle grip device.
Figure 32:
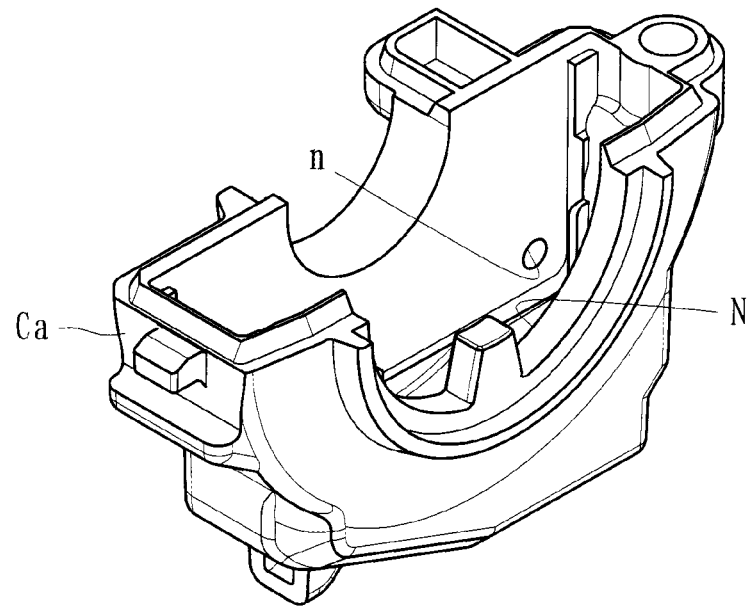
Figure 33:
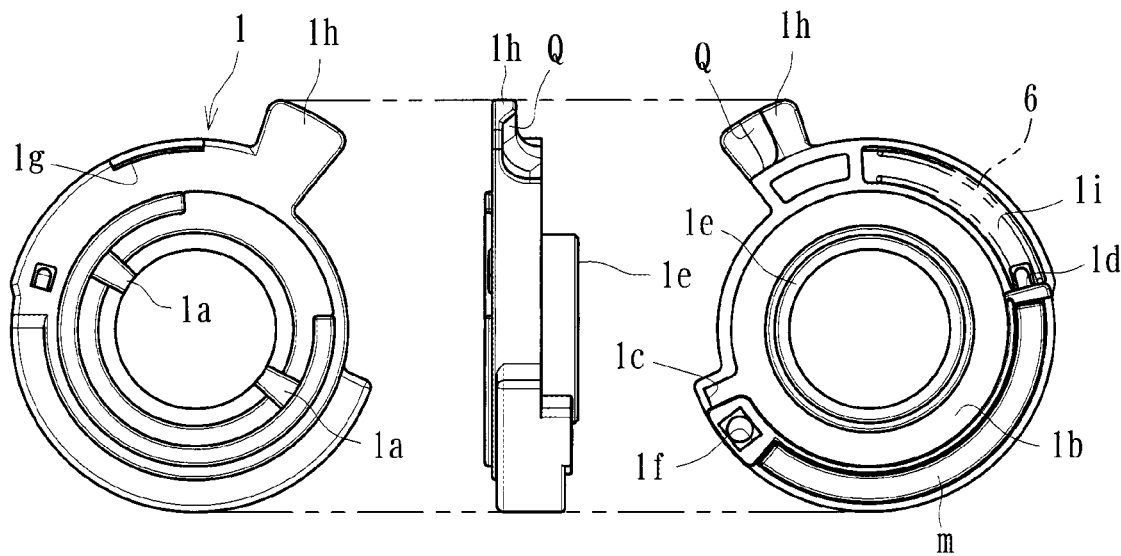
FIG. 33 is a three-side view showing an interlocking member of the throttle grip device.

Similarly to the first and second embodiments, the case C is fixed to the leading end side (the base end side of the throttle grip G) of the handle pipe H (see FIG. 30) of the two-wheeled vehicle (vehicle). As shown in FIGS. 30 and 31, the case C is configured by assembling the lower case Ca and the upper case Cb with the bolt B (see FIG. 30). As shown in FIG. 32, each of the lower case Ca and the upper case Cb has an accommodation recess formed therein. When the lower case Ca and the upper case Cb are assembled, an accommodation space is formed inside. Meanwhile, as shown in FIG. 32, the screw hole n is formed in the wall surface of the lower case Ca, and the holding member 4 can be screwed to a predetermined position in the lower case Ca.

Meanwhile, the magnetic sensor 2 (rotation angle detecting unit), the return spring 3, the holding member 4, the slide member 5, the reverse-rotation return spring 6, the spring 7, and the pressing part 8 are the same as those in the first and second embodiments, and a detailed description thereof will be omitted. Further, similarly to the second embodiment, the throttle grip G according to the present embodiment can be gripped by a driver and can be rotationally operated with respect to the handle pipe H (see FIG. 30) of the two-wheeled vehicle. As shown in FIG. 28, the throttle grip G can be rotationally operated both in a forward direction (α1) for rotating in a direction toward the driver and in a reverse direction (α2) for rotating in a direction away from the driver.

By the way, similarly to the second embodiment, the return spring 3 according to the present embodiment has a lower initial setting load than the reverse-rotation return spring 6. Therefore, in the contact state of the contact portion 5*c* and the holding portion 4*c*, the reverse-rotation return spring 6 is not compressed, and the holding portion 4*c* of the holding member 4 receives the urging force of the return spring 3. As a result, the holding member 4 can hold the interlocking member 1 urged by the return spring 3.

Figure 29:
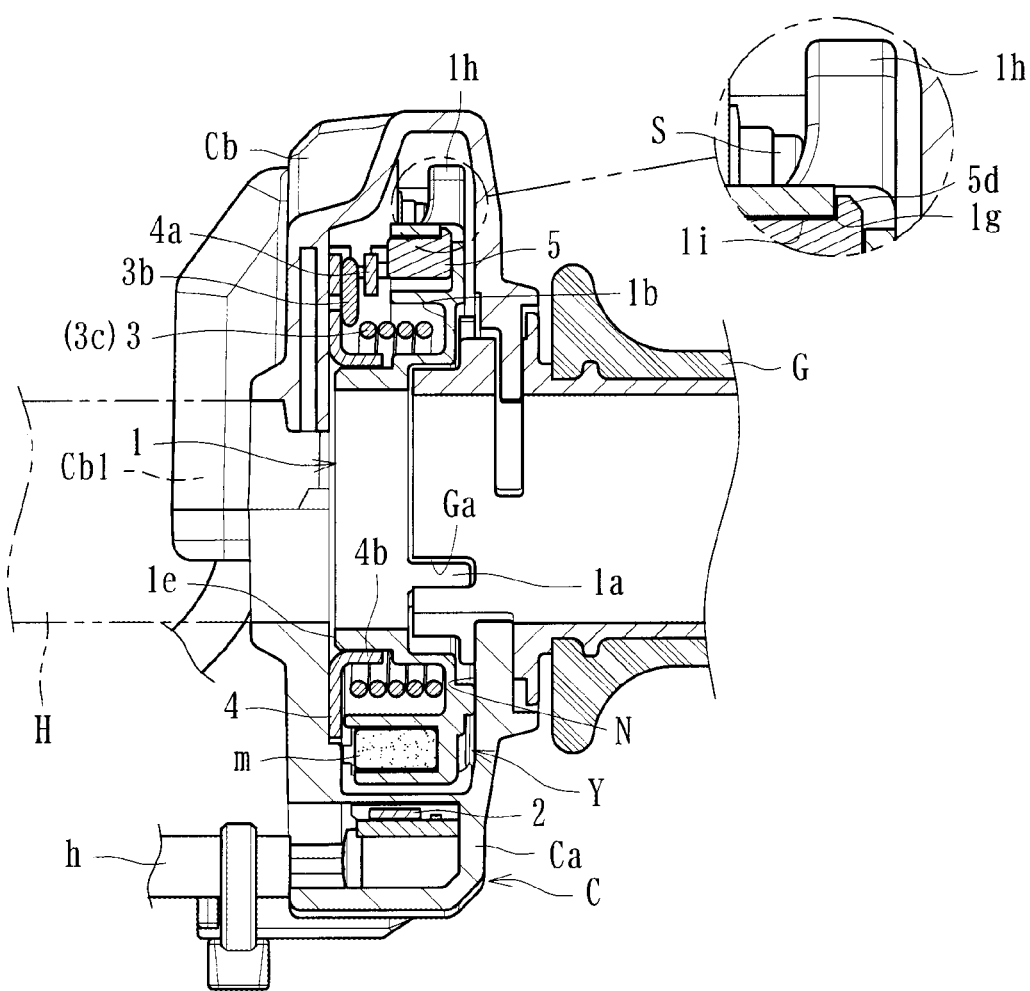
FIG. 29 is a sectional view taken along the line XXIX-XXIX in FIG. 28.

In this way, the holding member 4 locks the other end 3*b* of the return spring 3 accommodated in the accommodation recess 1*b*, and holds the interlocking member 1 with a predetermined urging force. Therefore, as shown in FIGS. 35 to 39, the interlocking member 1, the return spring 3 and the reverse-rotation return spring 6 are integrated. Thus, the interlocking member 1, the return spring 3 and the reverse-rotation return spring 6 integrated by the holding member 4 are referred to as the unit Y, and the unit Y is attached and fixed at a predetermined position in the case C, as shown in FIGS. 29 and 31.

Furthermore, similarly to the first and second embodiments, the return spring 3 according to the present embodiment urges the interlocking member 1 in the axial direction in addition to the rotation direction α (the direction toward the initial position when the throttle grip G is rotated in the forward direction α1). Specifically, as shown in FIG. 9, the return spring 3 according to the present embodiment is configured such that the coil portion 3*c* has a gap between adjacent windings. As shown in FIGS. 29 and 31, when the return spring 3 is accommodated in the case C in a state (a state of the unit Y shown in FIGS. 35 to 39) of being integrated by the holding member 4, the return spring 3 is compressed in a direction in which the gap between the windings of the coil portion 3*c* becomes smaller, and urges the interlocking member 1 in the axial direction β.

In this way, the interlocking member 1 is assembled with one end surface pressed against an inner peripheral surface of the case C by the urging force of the return spring 3 in the axial direction β. Therefore, when the throttle grip G is rotationally operated, the interlocking member 1 rotates against the urging force of the return spring 3 or the reverse-rotation return spring 6, and the one end surface of the interlocking member 1 slides while being pressed against the inner peripheral surface of the case C.

Here, in the throttle grip device according to the present embodiment, the engine of the vehicle can be controlled according to the rotation angle of the throttle grip G detected by the magnetic sensor 2 when the throttle grip G is rotationally operated in the forward direction α1 from the initial position, and electrical components (e.g., cruise control cancel function, etc.) mounted on the vehicle can be activated or deactivated when the throttle grip G is rotationally operated in the reverse direction α2 from the initial position.

Specifically, the magnetic sensor 2 according to the present embodiment can detect the rotational operation in the forward direction α1 of the throttle grip G, and the micro switch S can detect the rotational operation in the reverse direction α2 of the throttle grip G. The micro switch S is electrically connected to electrical components mounted on the vehicle. Further, when the micro switch S detects that the throttle grip G is rotated in the reverse direction α2 from the initial position, a detected signal is outputted, and the electrical components mounted on the vehicle are activated or deactivated.

In this way, when a driver grips and rotationally operates the throttle grip G in the forward direction α1 from the initial position, the engine E can be controlled according to the rotation angle of the throttle grip G, and the running at any speed can be performed. Further, when the throttle grip G is rotationally operated in the reverse direction α2 from the initial position, electrical components (e.g., cruise control cancel function, etc.) mounted on the vehicle can be activated or deactivated.

According to the second and third embodiments, the throttle grip G can be rotationally operated in the forward direction α1 and the reverse direction α2, the throttle grip G and the interlocking member 1 are urged in the rotation direction toward the initial position by the return spring 3 when the throttle grip G is rotationally operated in the forward direction α1 from the initial position, and the throttle grip device includes the reverse-rotation return spring 6 for urging the throttle grip G and the interlocking member 1 in the rotation direction toward the initial position when the throttle grip G is rotationally operated in the reverse direction α2 from the initial position. Therefore, it is possible to make the operation feeling different between the rotational operation in the forward direction α1 of the throttle grip G and the rotational operation in the reverse direction α2 of the throttle grip G. In this way, an appropriate urging force can be applied during each operation.

Furthermore, in the second and third embodiments, the return spring 3 is attached to the inner diameter side of the interlocking member 1, and the reverse-rotation return spring 6 is attached to the portion of the interlocking member 1 on the outer diameter side from the attachment position of the return spring 3. In this way, the return spring 3 and the reverse-rotation return spring 6 can be arranged in the radial direction of the interlocking member 1, so that an increase in the width dimension can be suppressed.

Moreover, in the second and third embodiments, the slide member 5 holding the reverse-rotation return spring 6 is attached to the interlocking member 1, the slide member 5 moves relative to the interlocking member 1 and compresses the reverse-rotation return spring 6 when the throttle grip G is rotationally operated in the reverse direction α2, and the urging force generated by the compression of the reverse-rotation return spring 6 is applied to the throttle grip G. Therefore, the rotational force in the reverse direction α2 of the throttle grip G can be smoothly and reliably transmitted to the slide member 5, and the urging force of the reverse-rotation return spring 6 can be efficiently applied to the throttle grip G.

In addition, the slide member 5 according to the second and third embodiments is formed of an arc-shaped part extending in the circumferential direction of the interlocking member 1, and the slide member 5 can move in the circumferential direction of the interlocking member 1 and compress the reverse-rotation return spring 6 when the throttle grip G is rotationally operated in the reverse direction α2. Therefore, the slide member 5 and its moving range can be easily formed with respect to the interlocking member 1.

Further, the magnetic sensor 2 (rotation angle detecting unit) according to the second and third embodiments is configured by a sensor that is capable of detecting the rotation angle of the interlocking member 1 by detecting a change in magnetism generated from the magnet m attached to a predetermined position of the interlocking member 1, and the magnet m and the slide member 5 are arranged side by side in the circumferential direction of the interlocking member 1. Therefore, an increase in the radial dimension of the interlocking member 1 can be suppressed, and the size of the throttle grip device can be reduced.

Furthermore, according to the second embodiment, the rotational operation in the forward direction α1 and the reverse direction α2 of the throttle grip G can be detected by the magnetic sensor 2 (rotation angle detecting unit). Therefore, a separate switch for detecting the rotational operation in the reverse direction α2 of the throttle grip G can be dispensed with, and the number of parts can be reduced. On the other hand, according to the third embodiment, the rotational operation in the forward direction α1 of the throttle grip G can be detected by the magnetic sensor 2 (rotation angle detecting unit), and the micro switch S capable of detecting the rotational operation in the reverse direction α2 of the throttle grip G is provided. Therefore, the rotational operation in the reverse direction α2 of the throttle grip G can be reliably detected by the micro switch S, and operability when starting the engine can be further improved.

In particular, according to the third embodiment, the micro switch S includes the operating portion Sa that can be operated while projecting and retracting, and the interlocking member 1 has the protruding portion 1h having the inclined surface Q formed on one surface. Further, the micro switch S is mounted such that the operation direction of the operating portion Sa is perpendicular to one surface of the protruding portion 1h of the interlocking member 1, and the operating portion Sa is pressed by the inclined surface Q and turned on when the interlocking member 1 is rotated in the reverse direction α2. In this way, the operating portion Sa of the micro switch S can be pressed within an appropriate stroke range when the interlocking member 1 is rotated in the reverse direction α2.

Figure 42:
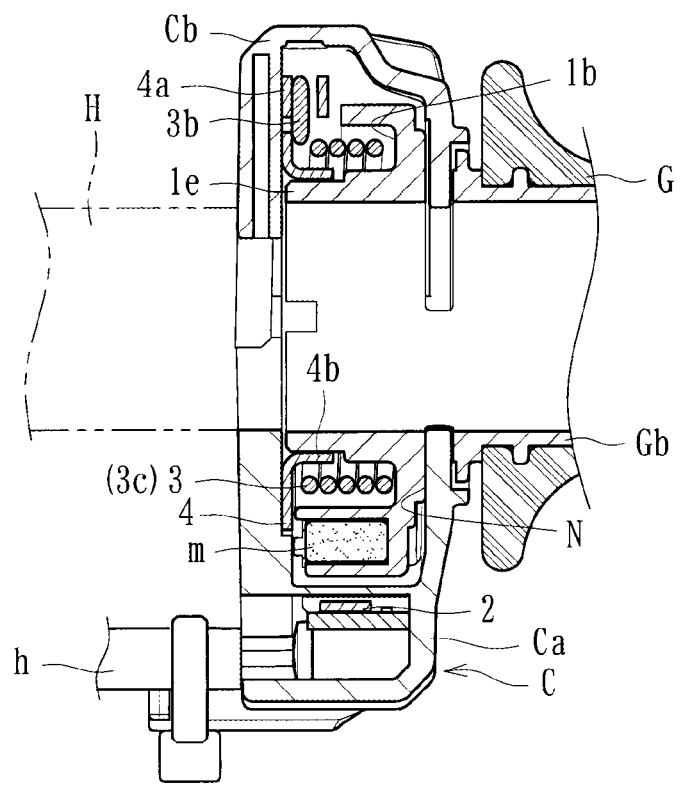
FIG. 42 is a sectional view showing a throttle grip device to which another type of holding member integrated with a throttle grip is applied.
Figure 43:
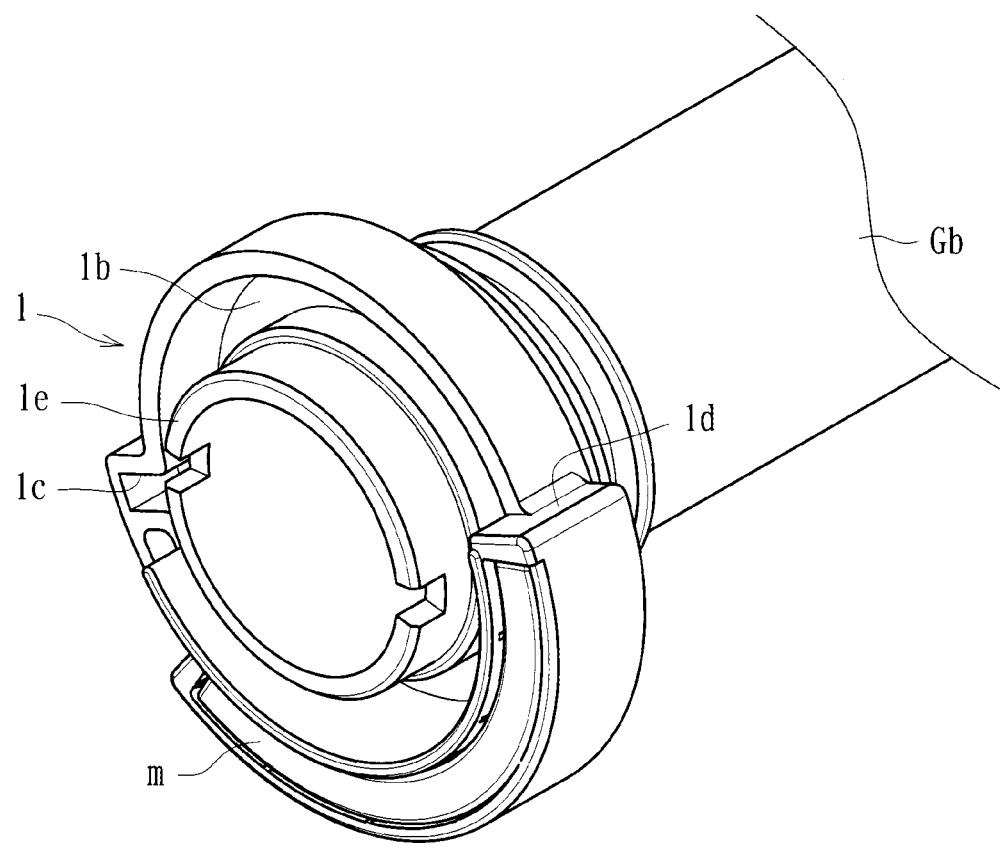
FIG. 43 is a perspective view showing another type of holding member integrated with the throttle grip.

Although the present embodiments have been described above, the present invention is not limited thereto. For example, as shown in FIGS. 42 and 43, the interlocking member 1 may be integrated with the throttle grip G (specifically, a core material of the throttle grip G). Similarly to the above embodiments, this interlocking member 1 is held by the holding member 4 and is integrated with the return spring 3. In this case, as compared with the case where the interlocking member 1 is separate from the throttle grip G, the number of parts can be reduced, and the workability in assembly of the throttle grip device can be improved.

Furthermore, instead of the magnetic sensor 2 for detecting the rotation angle of the throttle grip G, other general-purpose sensors (which are not limited to sensors for detecting magnetism of magnets, and which are not limited to non-contact sensors, but include contact sensors or the like) may be used. Moreover, instead of the magnet m, the interlocking member 1 may be magnetized in the circumferential direction. Meanwhile, the applicable vehicle is not limited to the two-wheeled vehicles as in the present embodiments, but the present invention may be applied to other vehicles (e.g., ATVs or snowmobiles or the like) having the handle bar H.

The present invention may be applied to a throttle grip device having a different external shape or a throttle grip device to which other functions are added, so long as it includes a holding member that rotatably holds the interlocking member while positioning the same and holds the other end of the return spring while locking the same.

The present invention may be applied to a throttle grip device having a different external shape or a throttle grip device to which other functions are added, so long as it includes the interlocking member which has the accommodation recess 1b for accommodating the return spring 3, and the holding member 4 which is attached to the interlocking member 1 while locking the other end 3b of the return spring 3 accommodated in the accommodation recess 1b and integrates the interlocking member 1 and the return spring 3.

What is claimed is:

1. A throttle grip device comprising:
   an interlocking member capable of rotating with a throttle grip of a vehicle;
   a rotation angle detecting unit capable of detecting a rotation angle of the throttle grip by detecting a rotation angle of the interlocking member;
   a return spring configured as a torsion coil spring which has a first end locked to the interlocking member and urges the throttle grip and the interlocking member in a rotation direction toward initial positions when the throttle grip is rotationally operated; and
   a holding member which rotatably holds the interlocking member while positioning the interlocking member and holding a second end of the return spring,
   wherein an engine of the vehicle can be controlled according to the rotation angle of the throttle grip detected by the rotation angle detecting unit, and
   wherein the holding member has a main body portion and a bent portion that is bent from the main body portion and configured to lock the second end of the return spring, the bent portion having a hook shape.

2. The throttle grip device according to claim 1, the holding member has a guide portion formed to protrude in an annular shape, and the interlocking member is positioned by being rotatably fitted to the guide portion.

3. The throttle grip device according to claim 2, the holding member has a holding portion held in contact with the interlocking member urged in the rotation direction by the return spring.

4. The throttle grip device according to claim 1, wherein the main body portion is an annular plate portion.

5. The throttle grip device according to claim 1, wherein the return spring urges the interlocking member in an axial direction in addition to the rotation direction.

6. The throttle grip device according to claim 1, wherein the interlocking member is separate from the throttle grip.

7. The throttle grip device according to claim 1, wherein the interlocking member is integrated with the throttle grip.

8. A throttle grip device comprising:
   an interlocking member capable of rotating with a throttle grip of a vehicle;
   a rotation angle detecting unit capable of detecting a rotation angle of the throttle grip by detecting a rotation angle of the interlocking member;
   a return spring configured as a torsion coil spring which has a first end locked to the interlocking member and urges the throttle grip and the interlocking member in a rotation direction toward initial positions when the throttle grip is rotationally operated; and
   a holding member which is attached to the interlocking member while locking a second end of the return spring,
   wherein an engine of the vehicle can be controlled according to the rotation angle of the throttle grip detected by the rotation angle detecting unit, and
   wherein the interlocking member has an accommodation recess that is annular and accommodates the return spring.

9. The throttle grip device according to claim 8, wherein the holding member has a locking portion for locking the second end of the return spring, and a holding portion held in contact with the interlocking member urged in the rotation direction by the return spring.

10. The throttle grip device according to claim 8, wherein the holding member is attached to the interlocking member while closing the accommodation recess.

11. The throttle grip device according to claim 8, wherein the holding member includes an annular plate portion.

12. The throttle grip device according to claim 8, wherein the return spring urges the interlocking member in an axial direction in addition to the rotation direction.

13. The throttle grip device according to claim 8, wherein the throttle grip can be rotationally operated in a forward direction and a reverse direction, the throttle grip and the interlocking member are urged by the return spring when the throttle grip is rotationally operated in the forward direction from the initial position of the throttle grip, and the throttle grip device comprises a reverse-rotation return spring for urging the throttle grip and interlocking member in the rotation direction toward the initial positions when the throttle grip is rotationally operated in the reverse direction from the initial position of the throttle grip.

14. The throttle grip device according to claim 13, wherein the return spring is attached to an inner diameter side of the interlocking member, and the reverse-rotation return spring is attached to a portion of the interlocking member on an outer diameter side from an attachment position of the return spring.

15. The throttle grip device according to claim 13, wherein a slide member for holding the reverse-rotation return spring is attached to the interlocking member, and when the throttle grip is rotationally operated in the reverse direction, the slide member moves relative to the interlocking member to compress the reverse-rotation return spring, and an urging force generated by the compression of the reverse-rotation return spring is applied to the throttle grip.

16. The throttle grip device according to claim 15, wherein the slide member is formed of an arc-shaped part extending in a circumferential direction of the interlocking member, and the slide member can move in the circumferential direction of the interlocking member and compress the reverse-rotation return spring when the throttle grip and interlocking member are rotationally operated in the reverse direction.

17. The throttle grip device according to claim 15, wherein the rotation angle detecting unit comprises a sensor that is capable of detecting the rotation angle of the interlocking member by detecting a change in magnetism generated from a magnet attached to a predetermined position of the interlocking member, and the magnet and the slide member are arranged side by side in a circumferential direction of the interlocking member.

18. The throttle grip device according to claim 13, wherein the rotational operation in the forward direction and the reverse direction of the throttle grip can be detected by the rotation angle detecting unit.

19. The throttle grip device according to claim 8, wherein the interlocking member is separate from the throttle grip.

20. The throttle grip device according to claim 8, wherein the interlocking member is integrated with the throttle grip.

* * * * *